(12) United States Patent
Gawad et al.

(10) Patent No.: US 10,100,175 B2
(45) Date of Patent: Oct. 16, 2018

(54) SOLUTION BLENDING PROCESS FOR THE FABRICATION OF NYLON6-MONTMORILLONITE NANOCOMPOSITES

(71) Applicant: AMERICAN UNIVERSITY IN CAIRO, New Cairo (EG)

(72) Inventors: Ahmed M. Abdel Gawad, New Cairo (EG); Adham R. Ramadan, New Cairo (EG); Amal M. K. Esawi, New Cairo (EG)

(73) Assignee: AMERICAN UNIVERSITY IN CAIRO, Cairo (EG)

( * ) Notice: Subject to any disclaimer, the term of this patent is extended or adjusted under 35 U.S.C. 154(b) by 0 days.

(21) Appl. No.: 15/295,310

(22) Filed: Oct. 17, 2016

(65) Prior Publication Data

US 2017/0029600 A1 Feb. 2, 2017

Related U.S. Application Data

(62) Division of application No. 14/371,502, filed as application No. PCT/IB2013/000415 on Jan. 10, 2013, now abandoned.

(Continued)

(51) Int. Cl.
C08K 9/04 (2006.01)
C08J 3/215 (2006.01)
(Continued)

(52) U.S. Cl.
CPC .............. *C08K 9/04* (2013.01); *B01D 9/0004* (2013.01); *B01D 9/0054* (2013.01); *C08J 3/215* (2013.01);
(Continued)

(58) Field of Classification Search
CPC ........ C08K 9/04; C08K 3/346; B01D 9/0004; B01D 9/0054; C08J 3/215; C08J 5/18
See application file for complete search history.

(56) References Cited

U.S. PATENT DOCUMENTS

2006/0074167 A1* 4/2006 Nelson .................. B82Y 30/00
524/445

FOREIGN PATENT DOCUMENTS

| CN | 1990549 | 7/2007 |
|---|---|---|
| WO | WO 2001/092388 | 12/2001 |
| WO | WO 2007/011394 | 1/2007 |

OTHER PUBLICATIONS

Ahmadi, S. J. et al. "Review: Synthetic routes, properties and future applications of polymer-layered silicate nanocomposites." J. Mater. Sci. 39, 2004, 1919-1925.

(Continued)

*Primary Examiner* — John E Uselding
(74) *Attorney, Agent, or Firm* — Norton Rose Fulbright US LLP

(57) ABSTRACT

In general the present disclosure relates to Nylon 6/montmorillonite clay nanocomposites with enhanced mechanical properties that have been prepared primarily by solution compounding. A major challenge in producing the Nylon 6/montmorillonite clay nanocomposites is associated with the exfoliation and dispersion of the clay particles within the polymer matrix. This disclosure presents compositions and methods for obtaining highly or fully exfoliated nylon 6/montmorillonite nanocomposites, not only for organically modified clays with known compatibility with nylon 6 (Cloisite 30B), but also for clays with low/no compatibility with nylon 6 (Cloisite 15A and $Na^+$-MMT) through solution compounding.

14 Claims, 22 Drawing Sheets

Related U.S. Application Data

(60) Provisional application No. 61/584,868, filed on Jan. 10, 2012.

(51) Int. Cl.
| | |
|---|---|
| *B01D 9/00* | (2006.01) |
| *C08J 5/18* | (2006.01) |
| *C08K 3/34* | (2006.01) |
| *B01F 13/08* | (2006.01) |
| *B01F 3/12* | (2006.01) |

(52) U.S. Cl.
CPC ............ *C08J 5/18* (2013.01); *C08K 3/346* (2013.01); *B01F 3/1221* (2013.01); *B01F 13/0818* (2013.01); *C08J 2377/02* (2013.01); *C08K 2201/011* (2013.01)

(56) References Cited

OTHER PUBLICATIONS

Aranda, P. and Ruiz-Hitzky, E. "Poly(ethylene oxide)-silicate intercalation materials." Chem Mater. 1992; 4: 1395-403.
Burnside, S. D. et al. "Synthesis and properties of a new poly(dimethylsiloxane) nanocomposites." Chem. Mater. 7, 1995, 1597-1600.
Chanda, M. et al. "Fabrication Processes." Plastics Technology Handbook. 4$^{th}$ ed. 47 vol. CRC Press, 2007.
Chen, B. "Polymer-Clay Nanocomposites: An overview with emphasis on interaction mechanisms." Brit. Ceram. T. 103, 2004, 241-249.
Dennis, H. R. et al. "Effect of melt processing conditions on the extent of exfoliation in organoclay-based nanocomposites." Polymer 42, 2001, 9513-9522.
Gao, F. "Clay/polymer composites: the story." Materials Today, 7, 20-55, 2004.
Gawad, A. et al. "Structure and properties of nylon 6 Clay nanocomposites: Effect of temperature and reprocessing." J. Mate. Sci. 45, 2010, 6677-6684.
Giannelis, E. P. "Polymer Layered Silicate Nanocomposites." Advanced Materials 8.1 (1996): 29-35.
Giannelis, E. P. "Polymer-layered silicate nanocomposites: synthesis, properties and applications." Appl. Organomet. Chem. 12, 1998, 675-680.
Jeon, H. G. et al. "Morphology of polymer silicate nanocomposites. High Density polyethylene and a nitrile." Polym. Bull. 41, 1998, 107-113.
Kim, S. W. "Effects of shear on melt exfoliation of clay in preparation of nylon organoclay nanocomposites." Polym. J. 34, 2002, 103-111.
LeBaron, P. C. et al. "Polymer-layered silicate nanocomposites: an overview." Appl. Clay Sci. 15, 1999, 11-29.
Lee, D. et al. "Effect of acidity on the deintercalation of organically modified layered silicates." Langmuir 18, 2002, 6445-6448.
Machine translation of CN 1990549. Jul. 2007.
Magaraphan, R. et al. "Preparation, structure, properties and thermal behavior of rigid-rod polyimide/montmorillonite nanocomposites." Compos. Sci. Technol. 61, 2001, 1253-1264.
Mani, G. et al. "Size reduction of clay particles in nanometer dimensions." Mater. Res. Soc. Symp. Proc. 740. 2003.
Ogata, N. et al. "Structure and Physical Properties of Cellulose Acetate/Poly(L-lactide Blends." J. Polym. Sci. 85, 2002, 1219-1226.
Okada, A. and Usuki, A. "Twenty Years of Polymer-Clay Nanocomposites." Macromolecular Materials and Engineering 291. 12 (2006): 1449-76.
Okada, A. et al. "Synthesis and properties of nylon-6/clay hybrids." In: Schaefer DW, Mark JE, editors. Polymer based molecular composites MRS Symposium Proceedings, Pittsburgh, vol. 171; 1990. p. 45-50.
Paci, M. et al. "Nanostructure development in nylon 6-Cloisite-30B composites. Effects of the preparation conditions." Europ. Polym. J. 46, 2010, 838-853.
Ramadan, A.R. et al. "Effect of ball milling on the structure of Na-montmorillonite and organo-montmorillonite (Cloisite 30B)." Appl. Clay Sci. 47, 2010, 196-202.
Ray, S. et al. "Polymer/layered Silicate Nanocomposites: A Review from Preparation to Processing." Progress in Polymer Science 28.11 (2003): 1539-641.
Search Report and Written Opinion issued in PCT/IB2013/000415, dated Jul. 16, 2013.
Strawhecker, K. E. and Manias, E. "Structure and properties of poly(vinyl alcohol)/Na—montmorillonite nanocomposites." Chem. Mater. 12, 2000, 2943-2949.
Vaia, R. A. et al. "Polymer melt intercalation in organically modified layered silicates: model predictions and experiment." Macromolecules, 30, 1997, 8000-8009.
Vaia, R. A. and Giannelis, E. P. "Lattice model of polymer melt intercalation in organically-modified layered silicates." Macromolecules 30, 1997, 7990-7999.
Wu, J. et al. "Structural, thermal, and electrical characterization of layered nanocomposites derived from sodium-montmorillonite and polyethers." Chem. Mater. 5, 1993, 835-838.
Yano, K. et al. "Synthesis and properties of polyimide-clay hybrid Films." J. Polym. Sci., Part A: Polym. Chem. 35, 1997, 2289-2294.

\* cited by examiner

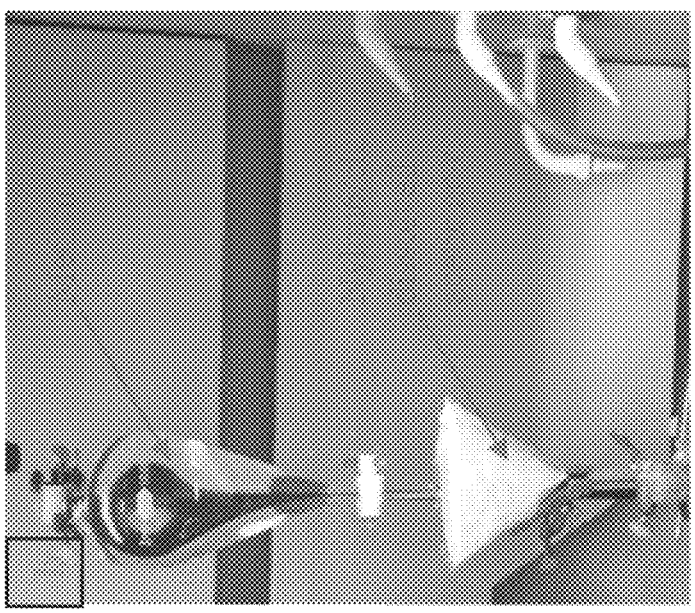
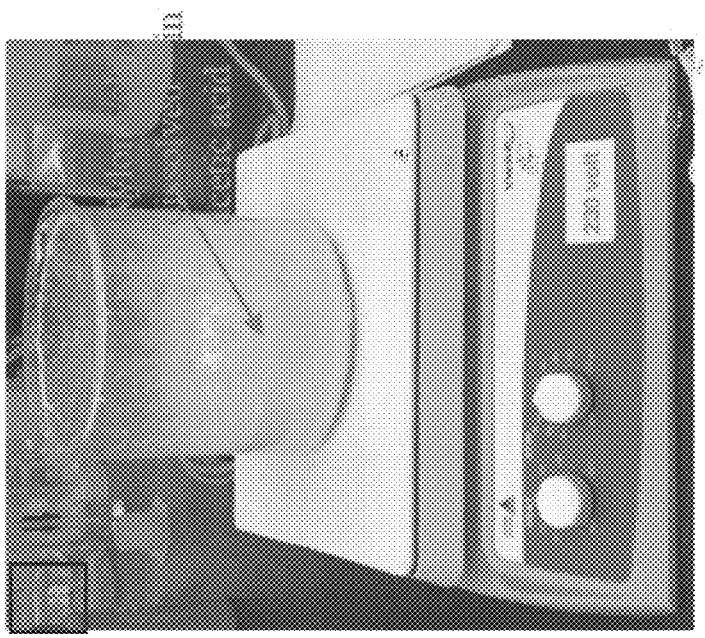
FIG. 6

SOLUTION BLENDING PROCESS FOR THE FABRICATION OF NYLON6-MONTMORILLONITE NANOCOMPOSITES

This application is a divisional application from U.S. application Ser. No. 14/371,502 filed Jul. 10, 2014, which is a national phase application under 35 U.S.C. § 371 of International Application No. PCT/IB2013/000415 filed Jan. 10, 2013, which claims priority to U.S. Provisional Patent Application Ser. No. 61/584,868 filed Jan. 10, 2012. The entire contents of each of the above-referenced disclosures is specifically incorporated herein by reference without disclaimer.

TECHNICAL FIELD

The present disclosure relates generally to nanocomposites and, in particular, Nylon 6-montmorillonite clay nanocomposites. More specifically, the present disclosure concerns compositions and methods which contain unmodified or organically modified nylon 6-montmorillonite clays.

BACKGROUND

Nanotechnology is a fast developing field that has attracted attention. One of the important applications of nanotechnology is the manufacturing of nanocomposites. In fact, "the real interest in nanotechnology is to create revolutionary properties and functions by tailoring materials and designing devices on the nanometer scale". (The Department of Chemistry, Michigan State University, "Nanocomposites—Classification Types, Potential Applications, Interactions and Novel Nanocomposites". Azom. 1 Nov. 2004<http://www.azonano.com/details.asp/ArticleID=1283>) The term "nanocomposites" implies that one of the phases of the composite material (the matrix or the reinforcement phases) is composed of particles or fibers with nano-dimensions. The main advantage of nanocomposites is their vastly improved mechanical properties with a relatively small content of the filler material. This is mainly due to the large surface area of the filler material. Moreover, nanocomposites show other enhancements depending on the filler and the matrix elements. For instance, carbon nanotubes (CNT's) are used in polymer and ceramic matrices to produce electrically conductive nanocomposites. CNT's are also used in combination with metals to make use of the outstanding mechanical properties of the CNT's and the ductility of metals like aluminum and copper (Mora et al., 2009).

Clay nanocomposites represent a class of nanocomposites in which the filler element is nanoclay. These materials are known as smectite clays, such as hectorite, montmorillonite (MMT), and synthetic mica. Smectite clays are peculiar in their structure as they are composed of layers. Each layer is built from tetrahedrally coordinated Si atoms fused into an edge shared octahedral plane of $Al(OH)_3$ or $Mg(OH)_2$ (Sinha Ray and Okamoto, 2003). The mechanical properties of these individual layers are not yet known. However, some attempts have been made to model the mechanical properties of the silicate layers estimating the Young's modulus along the layer direction to be 50-400 times higher than that of a typical polymer (Gao, 2004).

Mechanisms of Clay Dispersion

There are two mechanisms associated with the dispersion of the silicate layers in the polymer matrix, intercalation and exfoliation (Sinha Ray and Okamoto, 2003). The intercalation mechanism involves the insertion of polymer molecules between silicate layers. The interlamellar spacing of the clay particles is an important parameter in this case. After intercalation, the effective size of the clay particles is larger as the volume of the clay particle increases. In exfoliation, silicate layers are dispersed in the polymer matrix. The thickness of each layer is 1 nm, while its length is in the range of microns. FIG. 1 shows the structure of the exfoliated and intercalated nanocomposites versus the conventional microcomposite Advantages of Clay Nanocomposites The main advantage of clay/polymer nanocomposites over fiber-reinforced polymeric composites lies in the possibility of producing composites with enhanced mechanical properties (stiffness, yield strength, wear resistance) with very low clay content. Much experimental work has been done with clay content ranging between 3-6 wt % (Sinha Ray and Okamoto, 2003; and, Hasegawa et al., 2003).

Clay nanocomposites with exfoliated silicate layers show improved resistance to organic solvents (alcohols, toluene, and chloroform) (Fengge, 2004).

Clay nanocomposites manufactured by Toyota showed an increase in the heat distortion temperature (87° C.) and a 45% reduction in the thermal expansion coefficient. This was believed to be due to the reduction in molecular mobility in the polymeric matrix (Fenegge, 2004).

Another advantage of clay nanocomposites is their flame retardant properties. The peak heat release rate during combustion of nylon6 was found to be reduced by 63% for 5 wt % of clay (Fenegge, 2004).

Moreover, clay nanocomposites, in contrast to conventional composites, have good optical properties. In conventional polymeric composites, the composite tends to be opaque due to light scattering at the reinforcing phase whether fibers or particulates. However, silicate layers do not affect the optical properties of the polymer matrix and, therefore, the resulting composite is transparent. This has been explained using two different interpretations. First, the thickness of the exfoliated clay layers is much less than the wavelength of light thus allowing the light to pass without scattering. Second, in nanocomposites, the size of the reinforcement is in the nanoscale, which allows the formation of composites at the molecular level (Fenegge, 2004).

Commercial Applications

Clay/polymer nanocomposites have been used extensively for industrial applications most of which are automotive applications. In 1991, Toyota and Ube manufactured timing belt covers out of clay/nylon6 nanocomposite. FIG. 2 shows a timing belt cover made from nylon/clay nanocomposite. This was followed by Unikita's attempt to manufacture engine covers for Mitsubishi's engines out of clay/nylon6 nanocomposites. In 2001, clay/polyolefin nanocomposites were used by General Motors and Basell as a step assistant for GMC Safari and Chevrolet Astro vehicles. Shortly after this, nanocomposites were used for producing the doors of Chevrolet Impalas. Recently, clay/polypropylene nanocomposites were used by Noble Polymers in the manufacturing of the seat backs of Honda Acura (Fenegge, 2004; and, Okada and Usuki, 2006).

Moreover, other applications have been developed trying to make use of the inherent property of clay/polymer nanocomposites as gas barriers. Alcoa Closure Systems International has developed multilayer clay/polymer nanocomposites as a barrier for enclosure applications. Moreover, Honeywell produced clay/nylon6 nanocomposites for commercial products. Recently, nylon-MXD6 nanocomposites have been developed by Mitsubishi Gas Chemical in collaboration with Nanocor for PET products (Fenegge, 2004).

Limitations

Generally, there are two main challenges associated with the fabrication of nanocomposites. The first one is to maintain a good dispersion of the nanoparticles inside the matrix. As the particles get smaller in size, they tend to agglomerate. This agglomeration creates stress concentrations and yields non-uniform distribution of the load on the nanocomposites, which does not give the expected properties in the resulting nanocomposites. The second challenge is maintaining a good bonding at the interface between the matrix and the reinforcement phases. The lack of such bond would not allow load transfer from the matrix to the reinforcement. Organically modified clays have been used to compatibilize the polymer matrix with the clay in order to overcome those challenges. The organically modified clay is known as organoclay and will be described in later sections.

Therefore, there remains a need to develop new methods and compositions to overcome the challenges in obtaining nanocomposites.

BRIEF SUMMARY OF THE INVENTION

The present disclosure relates to nanocomposites based on nylon 6 and montmorillonite clays and solution blending processes for the fabrication of nanocomposites based on nylon 6 and montmorillonite clays. This process leads to improved exfoliation and dispersion of montmorillonite clay layers within the nylon 6 polymer matrix, overcoming the possible problem of polymer degradation, as well as the limitation of low/no compatibility between the montmorillonite clays and the nylon 6 polymer for the preparation of the nanocomposite even without the use of highly hydrophobic organic surfactants. Additionally, the process can also be possibly used to produce thin films from nylon 6 clay systems directly.

In certain embodiments, the nanocomposite comprises the reaction product of a polymer such as nylon 6 and a clay such as a montmorillonite clay.

The clay may further comprise an inorganic ion. For example, the inorganic ion can be any inorganic ions known in the art, such as calcium, potassium, sodium, or magnesium.

In alternative aspects, the clay may comprise an organic surfactant. The organic surfactant may have the structure of an ammonium ion modified by one to four carbon-containing R groups (NR4$^+$). For example, the R group can be an alkyl or aryl group. In some aspects, the organic surfactant does not have a R group that is hydroxyethyl group. Non-limiting examples of organic surfactants lacking hydroxyethyl groups may include dimethyl bis-hydrogenated alkyl tallow ammonium ion; benzyl, dimethyl hydrogenated alkyl tallow ammonium ion; trialkyl ammonium ion; octadecyltrimethyl ammonium ion; dioctadecyldimethyl ammonium ion; tricetadecylmethyl ammonium ion; dodecylammonium ion; hexadecylammonium ion; or distearyl dimethylammonium ion. In some other aspects, the organic surfactant may include one or more hydroxyethyl groups, such as methyl bis-2-hydroxyethyl hydrogenated alkyl tallow ammonium ion.

Even without the use of highly hydrophobic organic surfactants to modify the clay, certain aspects of the invention provide methods and compositions that concern nanocomposites achieving high exfoliation. The nanocomposites may have a high exfoliation as clay platelets are dispersed within the polymer matrix. The degree of exfoliation/dispersion may be about, at least, or at most 10, 20, 30, 40, 50, 100, 150, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 650, 700, 750, 800, 850, 900, 950, 1000, 1200, 1500, 2000, 2500, 5000, 10,000 platelets/square micron (μm$^2$) or any range derivable therein for the clay to exist or disperse in the nanocomposite. In particular aspects, the degree of exfoliation may be at least, about, or at most 200, 250, 300, 250, 400, 450, 500, 550, 600, 650, 700, 750, 800, 850, 1000 clay platelets/μm$^2$ or any range derivable therein.

In further aspects, the degree of exfoliation may be at least, at most, or about 500, 550, 600, 650, 700, 750, 800, 850, 900, 950, 1000, 1200, 1500 platelets/μm$^2$ or any range derivable therein, wherein the clay comprises an inorganic ion. In still further aspects, the degree of exfoliation may be at least, at most, or about 20, 30, 40, 50, 100, 150, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600 platelets/μm$^2$ or any range derivable therein, wherein the clay comprises an organic surfactant. In particular aspects, the clay may comprise at least, about, or at most 200, 400, 800, 1000 latelets/μm$^2$ or any range derivable therein. The nanocomposites can be used for a wide range of applications, such as being comprised into a film, a rubber, an article of manufacture, or a tire.

There may be also provided methods/processes for producing nanocomposites with improved exfoliation. In certain embodiments, the process works by dissolving the polymer such as nylon 6 in a compatible solvent (such as acetic acid) and the dispersion of the clays such as a montmorillonite clay in this solution. A flushing medium (such as alcohol) may be then used to wash away the solvent from the mixture resulting in solvent-free composite.

In further aspects, the solvent may be acetic acid, formic acid, trichloro acetic acid, phosphoric acid, sulfuric acid, chlorophenol, m-cresol, ethylene carbonate, HMPT (Hexamethylphosphoric Triamide), or mixtures thereof. In some aspects, the volume ratio between solvent and flushing medium is 1:20, 1:10, 1:5, 1:4, 1:3, 1:2, 1:1, 2:1, 3:1; 4:1, 5:1, 10:1, 20:1 or any range derivable therein. In a particular aspect, the ratio may be 1:4.

In certain aspects, the flushing medium may be any non-aqueous medium or any medium that does not dissolve at most or about 0.1, 0.5, 0.8, 1, 5, 10% (or any range derivable therein) solvents. The non-aqueous flushing medium may be alcohol, ester, ether, ketone, chloroform, or a mixtures thereof. For example, the flushing medium may be alcohol such as methanol, ethanol, or propanol; alternatively, the flushing medium may be ester such as methyl formate, ethyl formate, methyl propionate, isobutyl propionate, ethyl propionate, methyl acetate, or ethyl acetate; in other aspects, the flushing medium may be ketone such as acetone, diethyl ketone, methyl ethyl ketone, methyl propyl ketone, methyl isopropyl ketone.

The flushing medium may be flushed at a flow rate of at least, about, at most 1, 2, 3, 4, 5, 6, 7, 8, 9, 10, 15, 20, 30, 40, 50, 60, 70, 80, 90, 100, 150, 200, 500 mL/min or any range derivable therein. For example, the flow rate may be at about 5 to 50 mL/min.

In some exemplary embodiments, this disclosure presents the development of a process and its use to produce 3 types of nylon 6-montmorillonite nanocomposites (nylon 6/Cloisite Na+, nylon 6/Cloisite 15A, and nylon6/Cloisite 30B). All of the produced composites were characterized using TEM, XRD, FTIR, MFI, and nanoindentation. Results show enhanced exfoliation and dispersion of silicate layers within the polymer matrix for the 3 types of montmorillonite clays used: one with good compatibility between its organic modifier and the nylon 6 polymer (Cloisite 30B); one with low compatibility between its organic modifier and the nylon 6 polymer (Cloisite15A); and one with no compatibility due to lack of organic modifier (Cloisite Na+). This novel process surpasses conventional solution blending as well as melt blending with regards to obtained dispersion and exfoliation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The following drawings form part of the present specification and are included to further demonstrate certain aspects of the present disclosure. The invention may be better understood by reference to one of these drawings in combination with the detailed description of specific embodiments presented herein. Reference is now made to the following descriptions, in which:

FIG. 6 shows the solution mixing process: (a) stirring of nylon/clay (b) flushing of acetic acid;

DETAILED DESCRIPTION OF THE INVENTION

In certain aspects, there may be provided improved methods and compositions of nanocomposites. Nanocomposites may be inorganic-organic nanocomposites that is a composite in which the inorganic phase is no larger than 1 micron in size, and the organic (polymeric) phase is continuous; that is, nanocomposites are highly dispersed systems of submicron-sized inorganic particles in a polymeric matrix. In particular aspects of the nanocomposites, the inorganic component is a unmodified or modified clay (e.g., modified by comprising organic surfactants) and the organic component is a polymer.

The clay used in certain aspects of the invention may include montmorillonite clay (MMT), a member of a group of clay minerals known as "smectite clays" which is a member of a major category of clay minerals known as "2:1 phyllosilicates." Members of the MMT group vary greatly in the modes of their formation. Among all types of clays, MMT clays are known to have the highest degree of swelling. MMT clays are widely used commercially as a major component of the drilling mud in the oil industry, and a binder for the molding sand. MMT clays are also used for medical applications. See "Montmorillonite." McGraw-Hill Concise Encyclopedia of Science and Technology. New York: McGraw-Hill, 2006. Credo Reference. Web. 1 Jan. 2012 which is incorporated herein in its entirety by reference.

The polymer used in certain aspects of the invention may be Nylon 6. Nylon 6 belongs to a large group of polymers known as "polyamides." The name denotes the repetition of the amide group (—CO—NH—) in the polymeric chain. A major category of polyamides is synthetic linear aliphatic polyamides, which are commonly referred to as nylons. Nylons are known for their high toughness, tensile strength, impact strength, flexibility as well as their resistance to abrasion. The presence of the amide group in their structure allows the formation of intermolecular hydrogen bonds, which makes them have high degrees of crystallinity and, hence, high melting temperature and tensile strength. See Singh, Jagdamba, and R. C Dubey. Pragati's Organic Polymer Chemistry. Rev. ed. Meerut [India]: Pragati Prakashan, 2009 which is incorporated herein in its entirety by reference.

Figure 5:
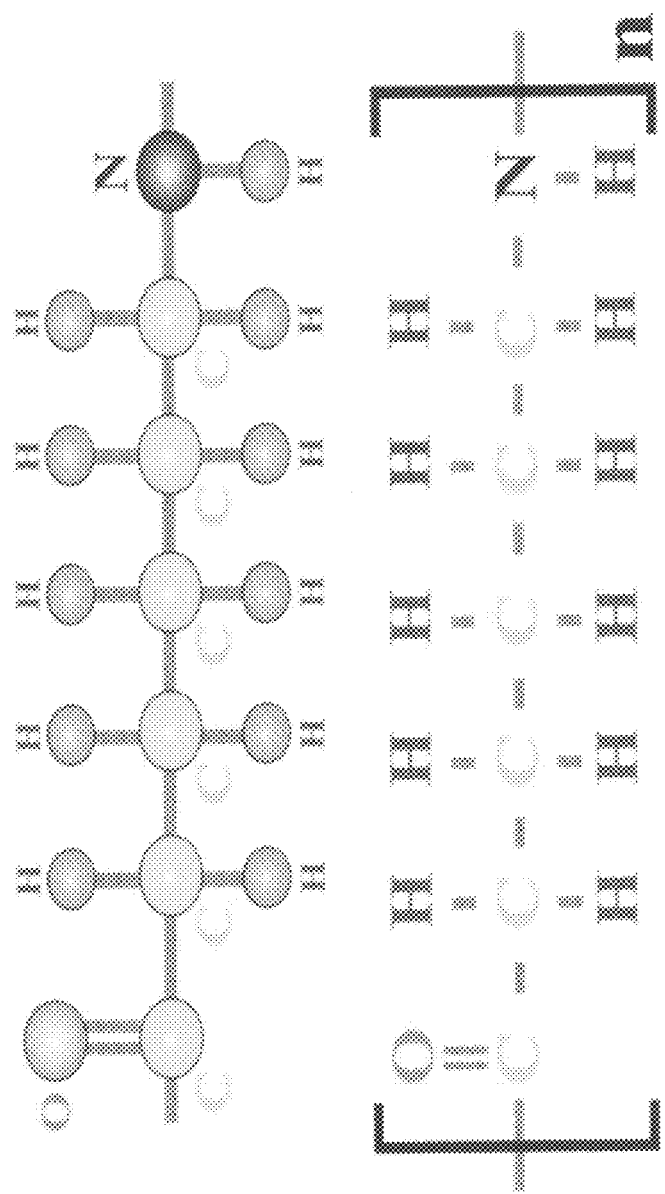
FIG. 5 shows the chemical Structure of nylon 6.

Nylon 6 is one of the most commercially available polyamides. Its monomer is caprolactam which is the cyclic amide of w-aminohexanoic acid (aminocaproic acid). FIG. 5 shows the exemplary chemical structure of nylon 6 monomer having a backbone with six carbon atoms. Nylon 6 may have a general structure as shown below (n as the number of repeating units may be at least 3).

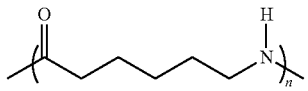

In general, the polymers used in the processes disclosed herein may be adapted such that the process uses any polyamide. Also, the polymer or polymer system used herein may be composed of one polymer or a mixture of two or more polymers.

Layered Silicates

Figure 1:
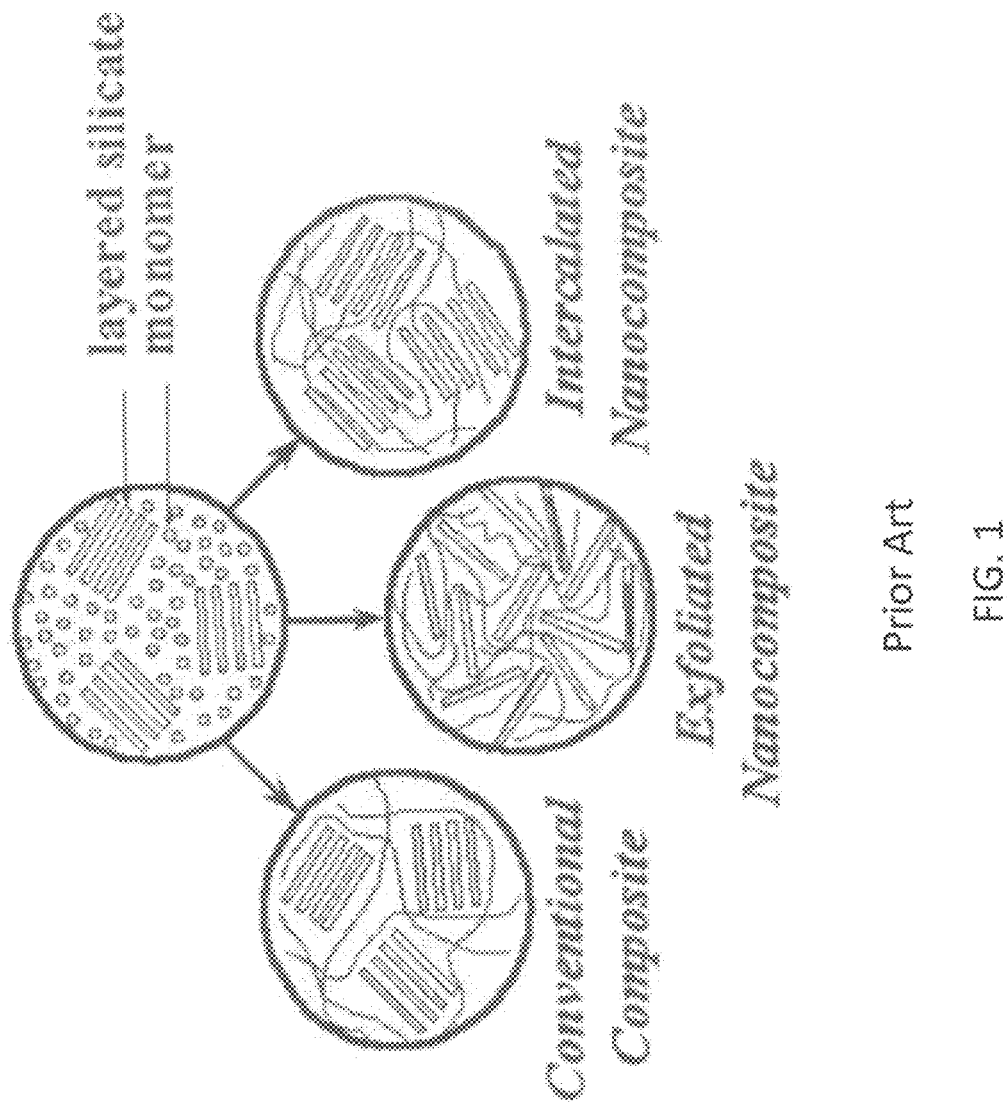
FIG. 1 shows the structure of polymer/layered silicate composites.
Figure 2:
FIG. 2 shows a timing belt cover made from nylon/clay nanocomposite.
Figure 3:
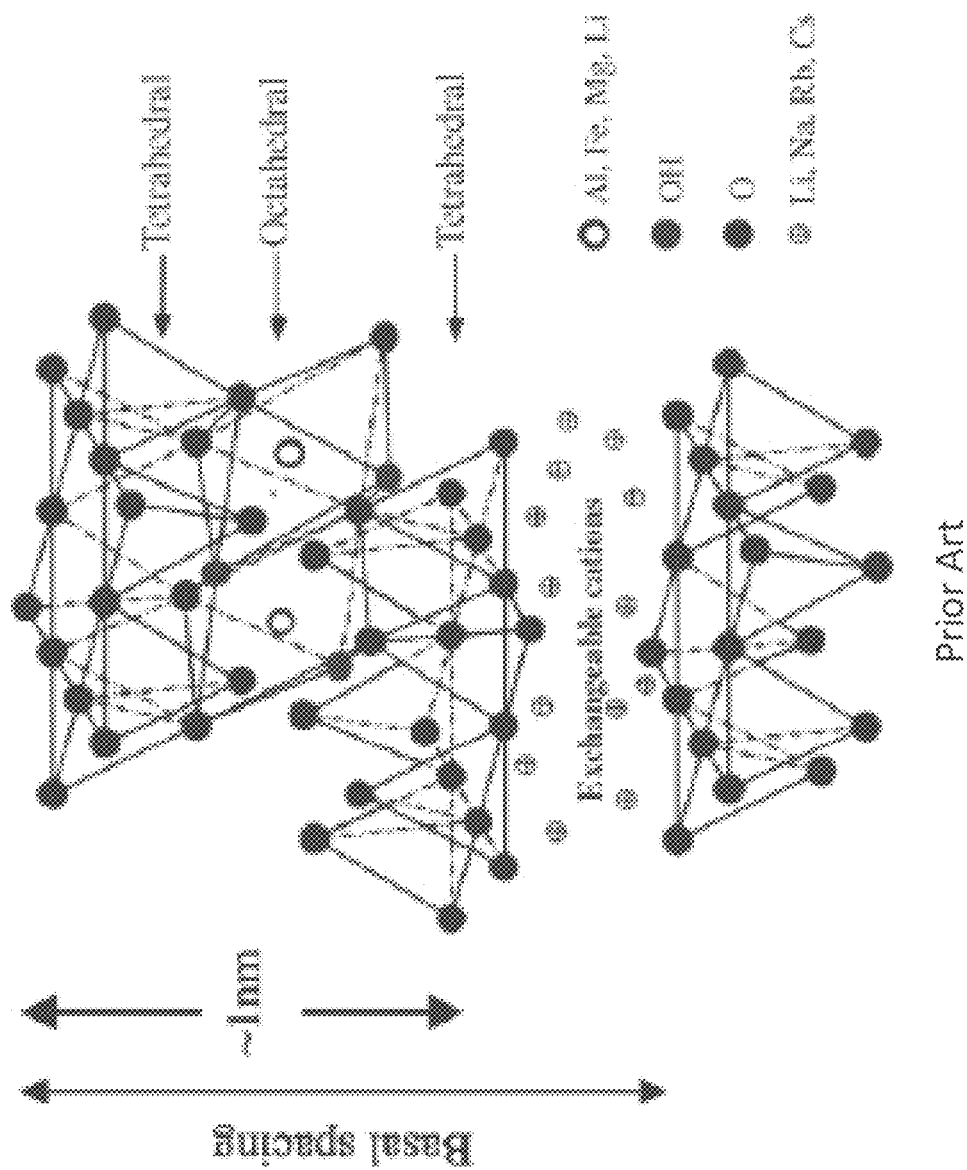
FIG. 3 shows the crystal structure of 2:1 phyllosilicates.

Layered silicates mostly used in polymer/layered silicates (PLS) are known as 2:1 phyllosilicates. The crystal structure of phyllosilicates consists of layers. The building unit of a layer, as shown in FIG. 3, is composed of two silicon atoms per unit making a tetrahedral arrangement that is fused to an-edge shared octahedral aluminum or magnesium hydroxide sheet. Each layer is about 1 nm in thickness with lateral dimensions ranging from 30 nm to microns depending on the structure of the phyllosilicate (Sinha Ray and Okamoto, 2003). Silicate layers are bonded together with van der Waal forces. The gap between these layers is known as the interlamellar, interlayer, or gallery gap. When minerals present in the octahedral layer are isomorphically substituted by other atoms such as the replacement of $Al^{3+}$ present in the octahedral layer of MMT by $Mg^{2+}$ or $Fe^{2+}$, this results in the generation of a negative charge. Such charge determines the clay capability of exchanging cations and therefore it is known as the cation exchange capacity (CEC). The cation exchange process occurs naturally due to the presence of alkali and alkaline earth cations, which counterbalances the negative charges present on the clay layers (Sinha Ray and Okamoto, 2003; Okada and Usuki, 2006; and, Giannelis, 1996). The chemical formula and some characteristic parameters of some common phyllosilicates are presented in Table 1 of Sinha Ray and Okamoto, 2003 the contents of which are incorporated herein in its entirety by reference and Table 1 of Sinha Ray and Okamoto, 2003 is incorporated herein as Table 1 of the present disclosure.

Layered silicates have two common characteristics that significantly affect the structure and properties of PLS nanocomposites: (1) they can be exfoliated into individual layers; and, (2) it is possible to attach organic and inorganic cations to bond to the surface of silicate layers through ion exchange reaction.

The production of polymer/layered silicates nanocomposites (PLSN's) with unique properties, compromising the properties of their constituents, has for long tantalized scientists and researchers. In 1989, researchers in Toyota research center labeled a first when they reported significant enhancements in the thermal and mechanical behavior of nylon 6 upon adding low content of montmorillonite clay (MMT) (Okada et al., 1990). This has revealed an immense research potential for this class of materials. In fact, there has been ample evidence from the literature on improvements in the mechanical, thermal, flame retardant, and gas separation properties as reported by several researchers (Amadi et al., 2004; Chen, 2004; Ginnelis, 1996; Giannelis, 1998; LeBaron et al., 1999; and, Abdel Gawad et al., 2010), which strongly put forward PLSN's as an alternative to the conventional microcomposites. Several research findings, as well as commercial applications, have accrued accordingly (Gao, 2004).

The mechanical and thermal properties of composites are generally dependent on the physico-chemical interaction between the matrix and the reinforcing phases. Due to the fact that silicate layers in pristine form are hydrophilic and most engineering polymers are organophilic (i.e., hydrophobic), such interaction is not favorable. It is rendered more favorable by incorporating an organic modifier in the clay structure. This is achieved by ion exchange reactions with cations such as primary, secondary, tertiary, and quaternary alkylammonium or alkylphosphonium cations, which also lead to the increase of the distance separating the silicate layers, the intergallery spacing, facilitating the intercalation of the polymer matrix in between these layers.

Several properties of the obtained nanocomposites have been found dependent on the degree of exfoliation of the silicate layers and their dispersion within the polymer matrix. Several research studies addressed improving exfoliation and dispersion of silicate layers by different means. Due to its ease and applicability on industrial scales, melt compounding has been most commonly used to prepare PLSN's. The technique utilizes mechanical shearing forces applied during extrusion or injection molding processes to increase the intergallery spacing between silicate layers allowing the polymeric chains to diffuse into the clay galleries (intercalation), or fully separate the silicate layers so that they no longer have their original stacked form (exfoliation). Some successful attempts to produce intercalated/exfoliated nanocomposites have been reported (Okada et al., 1990; Amadi et al., 2004; Chen, 2004; Ginnelis, 1996; Giannelis, 1998; LeBaron et al., 1999; and, Abdel Gawad et al., 2010).

Additionally, solution compounding has been used to prepare PLSN's. The process entails dispersion of clay powders in a dissolved polymer. As the silicate layers are dispersed in the polymeric solution, the polymer intercalates them. The polymeric chains are therefore confined due to intercalation. This is expected to decrease the entropy of the whole system. However, an opposing increase in entropy is gained through desorption of solvent molecules, which compensates the decrease in entropy due to confinement of polymeric chains (Vaia et al., 1997). For instance, solution compounding was used by Strawhecker and Manias (Strawhecker and Manias, 2000) to prepare polyvinyl alcohol (PVA)/montmorillonite (MMT) nanocomposites. Moreover, polyethylene oxide (PEO)/$Na^+$-MMT nanocomposites were prepared by Aranda and Ruiz-Hitzky (Aranda and Ruiz-Hitzky, 1992) using a mixture of water and methanol as solvents. Similarly, Wu et al. (Wu et al., 1993) prepared intercalated PEO/$Na^+$-MMT and PEO/$Na^+$-hectorite nanocomposites. Ogata et al. (Ogata et al., 1997) attempted to compound polylactic acid (PLA) with organically modified montmorillonite using chloroform as a solvent. However, the intercalation of PLA into the clay structure was not successful.

Although the use of solution compounding with engineering polymers is limited, some attempts were reported in the literature. Yano et al. (Yano et al., 1993) succeeded to synthesize polyimide/MMT nanocomposites by the sonication of MMT clay for 2 min. at room temperature. A dimethyl acetamide (DMAC) solution of polyamic acid and a DMAC dispersion of MMT modified with dodecylammonium cations were used. Different types of organically modified clays were employed in this study: $12CH_3$-MMT, 12COOH-MMT, and Cloisite 10A-MMT. Evident by x-ray diffraction (XRD) observations, 12CH$_3$-MMT nanocomposites were found to have an exfoliated and uniformly dispersed structure while 12COOH-MMT, and Cloisite 10A-MMT were poorly dispersed within the polyimide matrix. Polyimide/MMT nanocomposites were also prepared in another study (Magaraphan et al., 2001) using N-methyl-2-pyrrolidone as a solvent. Polyamic acid precursors were dissolved with organically modified MMT. TEM and XRD observations revealed a fully exfoliated structure for low MMT content, while the presence of clay tactoids is associated with higher MMT content leading to a partially exfoliated structure. Other attempts to prepare PLSN's using solution compounding were reported for high density polyethylene (HDPE) (Jeon et al., 1998) and Poly-dimethylsiloxane (PDMS) (Burnside et al., 1995).

Recently, Paci et al. (Paci et al., 2010) reported the preparation of nylon 6/Cloisite 30B nanocomposites by solution compounding. Formic acid was used as a solvent and a solution of clay suspended in formic acid or a mixture of formic acid and dimethylformamide (DMF) was then added to the dissolved polymer. Distilled water was used to flush the solvent. According to the authors, solution compounding failed to intercalate Cloisite 30B regardless of the clay content.

Static melt annealing presents another approach which has been investigated for the preparation of PLSN's. It is based on the possibility of diffusion of the polymeric chains into clay galleries when the sample is allowed to anneal above its melting temperature. In this context, early work by Vaia and Giannelis (Vaia and Giannelis, 1997) noted the possibility of intercalation of organically modified silicate layers by Polystyrene. The final structure was found to depend on the time needed for the polymer to diffuse into clay galleries and therefore dependent on the molecular weight of the polymer. The authors suggested that polar interactions between the polymer and the clay layers are essential for the polymer to intercalate the clay galleries. Furthermore, Dennis et al. (Dennis et al., 2001) affirmed that in case of good compatibility between the polymer and the silicate layers, un-assisted exfoliation is very likely to occur, for example, in this case in nylon 6/Cloisite 30B nanocomposite. Jo et al. (Kim et al., 2002) presented a study corroborating the latter findings. Evident by XRD for the case of nylon 6/Cloisite 30B, where polar interactions between the polymer and the organic modifier take place, un-assisted exfoliation could be obtained by static melt annealing. In case of nylon 6/Cloisite 25A, exemplifying low compatibility between the polymer and the silicate layers, static melt annealing did not yield exfoliation even when increasing the annealing time to 60 minutes. Paci et al. (Paci et al., 2010) studied the effect of static melt annealing on the extent of exfoliation or intercalation for nylon 6/Cloisite 30B. They found that annealing at 250° C. for 10 minutes lead to full exfoliation for a 5% by weight clay content and lead to intercalation for 10% and 20% by weight clay contents.

Generally, research addressing solution compounding for the preparation of polymer clay nanocomposites is somewhat limited. In this regard, this disclosure presents a method of preparation as applied to nylon 6/montmorillonite systems, and in particular this disclosure presents a discussion on the effect of the type of organic modifier in the clay, together with the effect of the structural morphology of the obtained composites on their mechanical properties.

Organically Modified Layered Silicates (OMLS)

It is known that the mechanical and thermal properties of composites are, in general, dependent on physical interaction between the matrix and the reinforcing phases. Due to the fact that silicate layers in pristine form are hydrophilic and most engineering polymers are organophilic, such interaction is not favorable. Therefore, the surface of silicate layers has to be organically modified to bond with the polymeric matrix. This is achieved by ion exchange reactions with cations such as primary, secondary, tertiary, and quaternary alkylammonium or alkylphosphonium cations. These organic surfactants are responsible for increasing the intergallery distance of the silicate layers and hence enable the intercalation of the polymer matrix into silicate layers (Sinha Ray and Okamoto, 2003).

Fabrication Techniques

The fabrication techniques mentioned below are commonly used for producing polymer layered silicate nanocomposites (PLSN). In addition to these techniques, there are other processes for fabrication of clay/polymer nanocomposites like solid intercalation, covulcanization, sol-gel method, in-situ formation (Sinha Ray and Okamoto, 2003), and slurry compounding (Hasegawa et al., 2003).

In-situ polymerization involves the insertion of monomer between clay layers, and then achieving the dispersion of silicate layers by means of polymerization. This process was first used by Toyota researchers to produce clay/nylon6 nanocomposites. This method showed good exfoliation of the clay in the polymer matrix. It is efficient in producing nanocomposites especially for thermosetting polymeric matrices (Sinha Ray and Okamoto, 2003).

Melt processing, sometimes referred to as melt intercalation, or melt blending is the process of compounding the polymer matrix with the clay during melting (Sinha Ray and Okamoto, 2003). The process, first reported by Vaia et al. (Vaia et al., 1993) is applicable with extrusion and injection molding processes (Sinha Ray and Okamoto, 2003). The technique has been used extensively in the literature to produce exfoliated and intercalated PLS nanocomposites.

In certain aspects of the present invention, there may be provided methods for obtaining nanocomposites based on the use of solutions, such as solution blending or in combination with any of the methods available, such as those mentioned above. Solution-induced intercalation (solution blending) involves the use of solvents to disperse the clay layers in polymeric solutions. The disadvantage of this process can be the high cost associated with some solvents, the availability of compatible solvents, as well as health and safety precautions which can be needed for the process, and which can hinder the commercial use of this process. Exceptions to this are water-soluble polymers (Sinha Ray and Okamoto, 2003).

In further aspects of the invention, the process can be generally be used with any nanofiller (e.g. smectite clays, carbon nanotubes, fullerenes, ceramic nanoparticles and/or nanorods, metallic nanoparticles and/or nanorods, etc.). It can be used for one type of nanofillers or a combination of two or more types of nanofillers.

All solvents of polyamides can be used. For a particular polymer system, the solvent must dissolve the polymer(s), and must not dissolve, or in any way adversely affect, the nanofiller(s). In addition, the flushing medium must be a non-solvent for the polymer(s), and should be miscible with the solvent(s) used. The flushing medium must not dissolve most or all, or in any way adversely affect, the nanofiller(s).

In certain embodiments of the invention, the process comprises the step of dissolving the polymer in the solvent. This step may be varied by (1) changing the quantities of polymer dissolved in the solvent; (2) changing the temperature at which dissolution is carried out; and/or (3) dissolving more than one polymer in the solvent, or alternatively dissolving each polymer type in its own solvent, then mixing the solutions.

In some embodiments, the process further comprises the step of dispersing the nanofiller in the solvent. This step may be varied by (1) pretreatment of the nanofiller (e.g. chemically for the functionalization of carbon nanotubes, mechanically by ball milling smectite clays to decrease particle size and/or separate the layers); and/or, (2) dispersion of more than one type of nanofiller in one or more solvents.

In some embodiments, the process further comprises the step of mixing the dispersed nanofiller and the dissolved polymer and stirring. This step may be varied by changing the time of mixing and stirring in order to ensure good dispersion of the nanofiller within the polymer solution.

In some embodiments, the process further comprises the step of cooling the mixture. This step may be varied by (1) changing the temperature at which the mixture is cooled; (2) cooling until the mixture solidifies; and/or (3) changing the rate of cooling.

In some embodiments, the process further comprises the step of flushing the mixture with the washing medium. This step may be varied by (1) changing the ratio of volume of the flushing medium used to the volume of the solvent used to dissolve the polymer; and/or (2) changing the flow rate of the flushing medium over the mixture.

In some embodiments, the process further comprises the step of evaporation of the flushing medium. This step may be varied by modifying the method of evaporation of the flushing medium. The method of evaporation may be varied depending on the polymer, the solvent, the nanofiller and/or the flushing medium.

Acetic and formic acids have been found as solvents for nylon 6 (Polymer handbook, 4th ed., J. Brandrup, E. H. Immergut, and E. A. Grulke, editors; A. Abe, D. R. Bloch, associate editors, New York: Wiley, 1999). In this work, acetic acid was used because it is less harmful, as indicated by material safety data sheets (MSDS) for both acids. In order to determine the quantity of nylon6 that can be dissolved in acetic acid till saturation, increments of nylon6 pellets were added to 100 ml of boiling acetic acid (108° C.). It was found that saturation occurs after the addition of 10 g of nylon6.

Several experimental trials were carried out in order to develop the solution compounding process. These are described below.

Figure 4:
FIG. 4 shows the degradation of nylon6 after evaporation of acetic acid.

Dissolving nylon 6 in glacial acetic acid and then heating the mix in a furnace at 90° C. for 24 hours lead to degradation of the polymer visible by the yellowish color of nylon6, as seen in FIG. 4.

The same problem was addressed in U.S. Pat. No. 5,430,068 and overcome by washing the polymer/solvent mix with distilled water in order to remove the acetic acid. Although this technique was successful in processing the neat nylon 6, it did not work with clay/nylon 6 nanocomposite. The existence of bubbles in the final molded specimens was observed as shown. It seems that the water used in flushing the acetic acid caused the silicate layers to swell (due to the high polarity of water), and could not be disposed of even after heating the composite under vacuum for 72 hours. The problem of swelling was reported in (Aranda and Ruiz-Hitzky, 1992) for PEO/Na$^+$ MMT nanocomposites.

The flushing media was therefore replaced by methanol. Several trials were done in order to determine the optimum methanol: acetic acid ratio. It was found that a ratio of 4:1 (by volume) yields acetic-free composite.

In addition, the flow rate of methanol was found to play a role in the flushing process. At high flow rates, the methanol passes on without effectively flushing the acetic acid.

Exemplary uses of the compositions comprising the nanocomposites according to certain aspects of the present invention are described hereinafter, without particularly limiting thereto: nanocomposite automatic timing belt cove, airplane interiors, fuel tanks, components in electrical and electronic parts, under-the-hood automotive structural parts, brakes and tires, or nanocomposite barrier films may be used in food packaging and in other applications.

Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Materials

Polymers

Nylon 6 (3 mm pellets) was obtained from Sigma-Aldrich® with the following specifications: $T_m$=228.5° C.; $T_g$=62.5° C.; and, Density: 1.084 g/cc. FIG. 5 shows the chemical structure of nylon6 monomer having a backbone with six carbon atoms.

Clays

Organically modified Sodium based MMT clays were purchased from Southern Clay Products, Inc.

Cloisite 30B

Cloisite 30B is an organically-modified clay obtained by ion exchange of Sodium MMT with methyl tallow bis-2-hydroxyethyl quaternary ammonium and has a modifier concentration of 90 meq/100 g. As reported by the supplier, Cloisite 30B has an interlamellar spacing of 18.5 Å and a density of 1.98 g/cc.

Cloisite 15A

Cloisite 15A is an organically-modified clay obtained by ion exchange of Sodium MMT with dimethyl dehydrogenated tallow quaternary ammonium and has a modifier concentration of 125 meq/100 g. As reported by the supplier, Cloisite 15A has an interlamellar spacing of 31.5 Å and a density of 1.66 g/cc.

Cloisite Na$^+$

Cloisite Na$^+$ is the natural sodium based MMT. As reported by the supplier, Cloisite Na$^+$ has an interlamellar spacing of 11.7 Å and a density of 2.86 g/cc.

The particle size distribution as reported by the manufacturer for all types of clays is presented in Table 2.

TABLE 2

| Clay particle size distribution (by volume) | | |
|---|---|---|
| 10% less than | 50% less than | 90% less than |
| 2 μm | 6 μm | 13 μm |

The type and wt % of organic content as reported by the manufacturer for all types of clays is presented in Table 3.

TABLE 3

Type and quantity of organic modifiers

| Clay | Compatibilizer | % wt. organic content |
|---|---|---|
| Na+-MMT | — | — |
| Cloisite 15A | $CH_3-\overset{\underset{\displaystyle HT}{\displaystyle |}}{\underset{\displaystyle |}{N^+}}-HT$ with $CH_3$ | 44.5% |
| Cloisite 30B | $CH_3-\overset{\underset{\displaystyle CH_2CH_2OH}{\displaystyle |}}{\underset{\displaystyle |}{N^+}}-T$ with $CH_2CH_2OH$ | 28% |

Solution Compounding Process:
1. 500 ml of glacial acetic acid were heated till boiling (108° C.).
2. 50 g of nylon 6 were added to the boiling acetic acid and magnetically stirred till they were totally dissolved (almost in 15 minutes) (FIG. 6 (*a*)).
3. Meanwhile, 5 wt % of clay was added to 50 ml of acetic acid and magnetically stirred at room temperature for 15 min.
4. As soon as nylon 6 was dissolved, the clay/acetic acid mix was added to the dissolved polymer.
5. The beaker containing nylon 6/clay mix was taken and put on another stirrer with no heating (to minimize exposure time to heat and hence degradation of the polymer) and stirred till cooling to room temperature (approximately in 1 hour)
6. The nylon 6/clay mix was then washed with 2200 ml of methanol (methanol to acetic acid volume ratio=4:1). (FIG. 6 (*b*)).
7. The composite was then put in the oven under vacuum at 90° C. for 48 hours to dry.

Compression Molding

Figure 7:
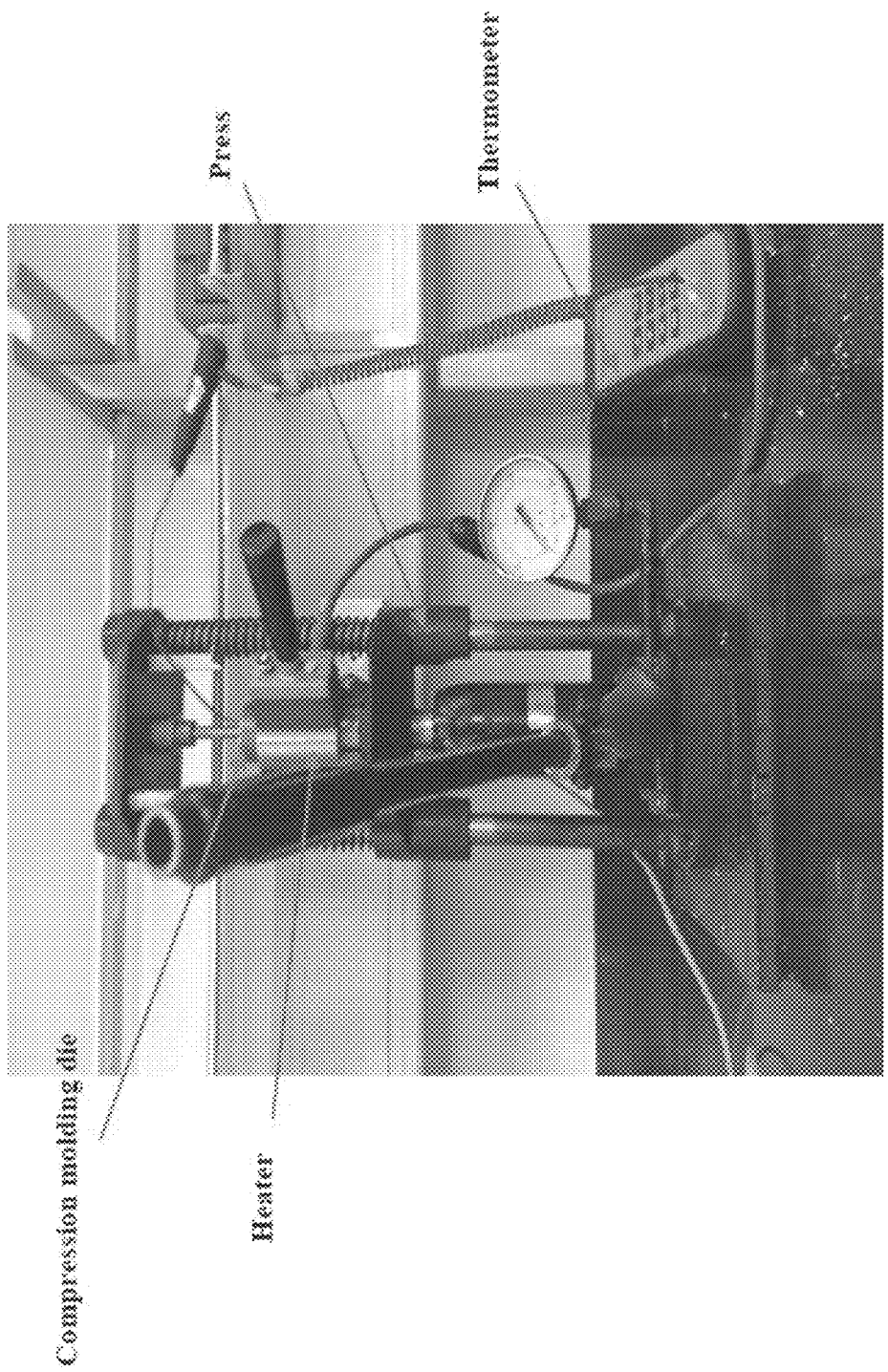
FIG. 7 shows the compression molding of sample.

All samples were prepared by compression molding at 240° C. for 5 minutes under 65 MPa (FIG. 7). The die, stopper, and the plunger were lubricated with silicone grease to avoid sticking. Materials were then inserted into the die and compressed under 65 MPa. The applied pressure was then released and reapplied again, which is known as breathing (Chanda and Salil, 2007), in order to eliminate any entrapped bubbles within the molded sample. The sample was then heated till 240° C. while maintaining a constant pressure. The temperature was fixed for 5 minutes to ensure melting of the whole sample. Cooling was then started via a fan. After reaching 45° C., the sample was extracted from the die, wrapped in aluminum foil and put inside a polyethylene zipper bag to avoid moisture absorption. The molded samples have cylindrical shape with a diameter of 10 mm and a height of 20 mm.

X-Ray Diffraction

Figure 8:
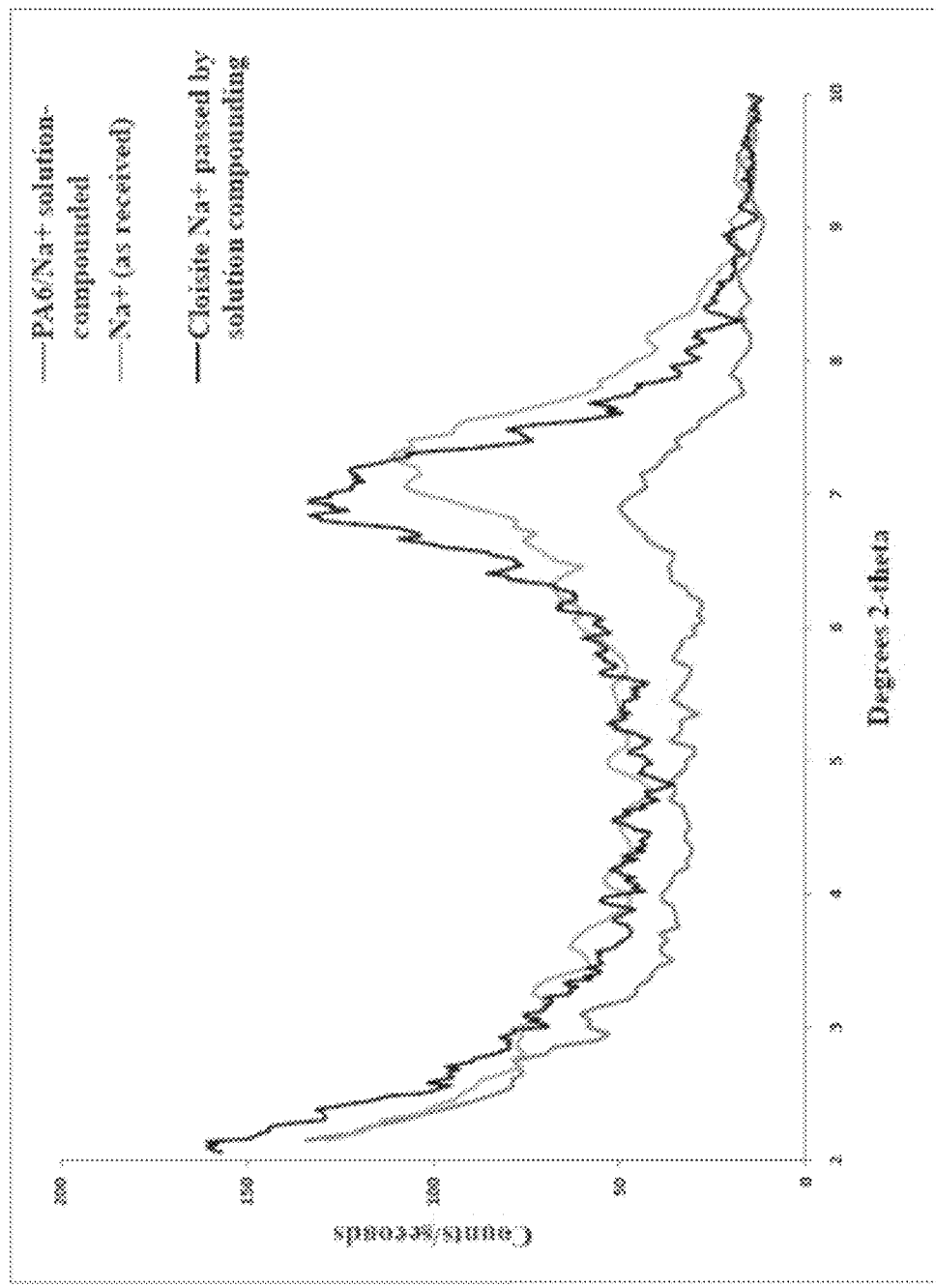
FIG. 8 shows the XRD diffraction patterns for the different samples.
Figure 9:
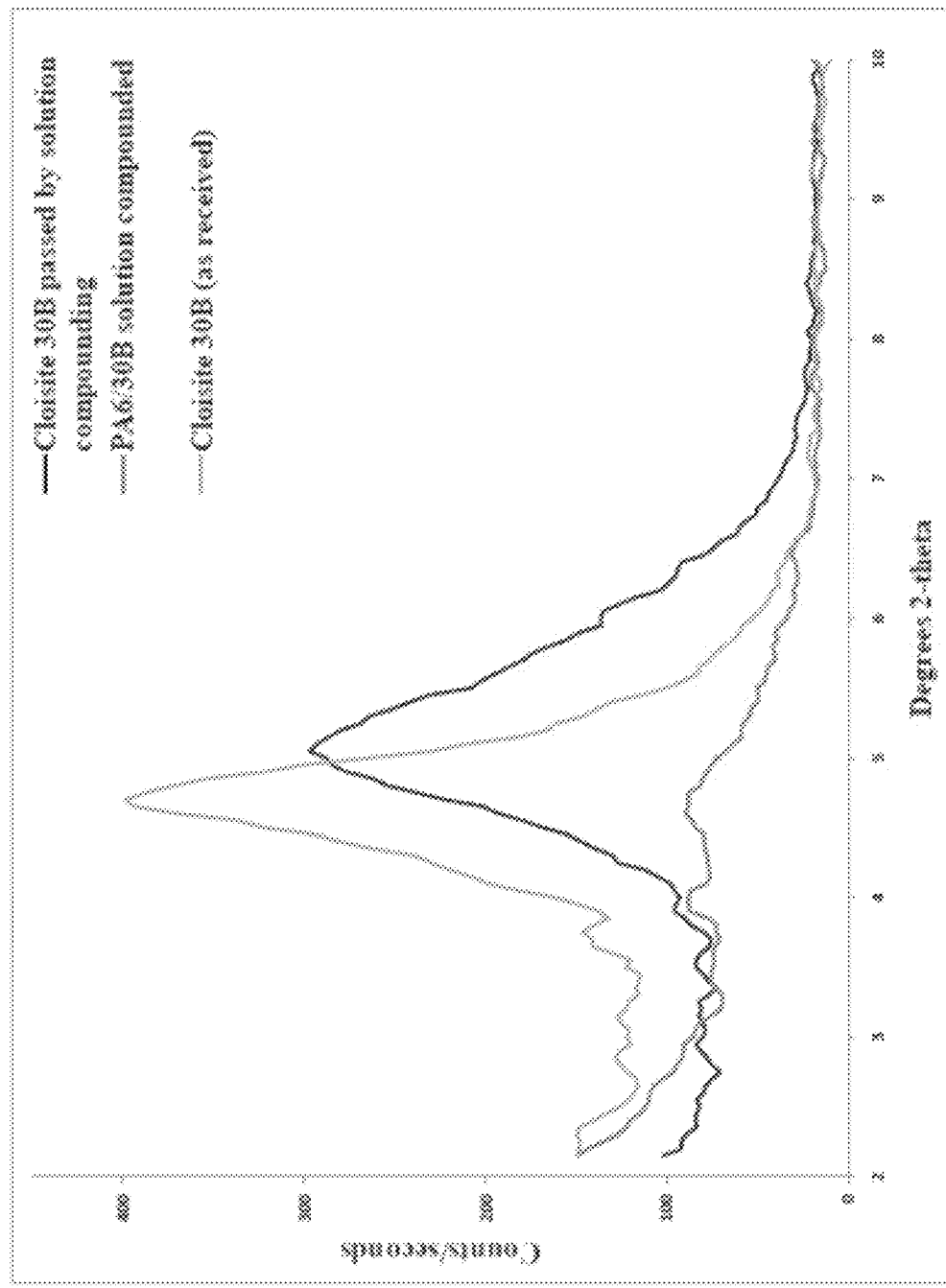
FIG. 9 shows the XRD diffraction patterns for the different samples.
Figure 10:
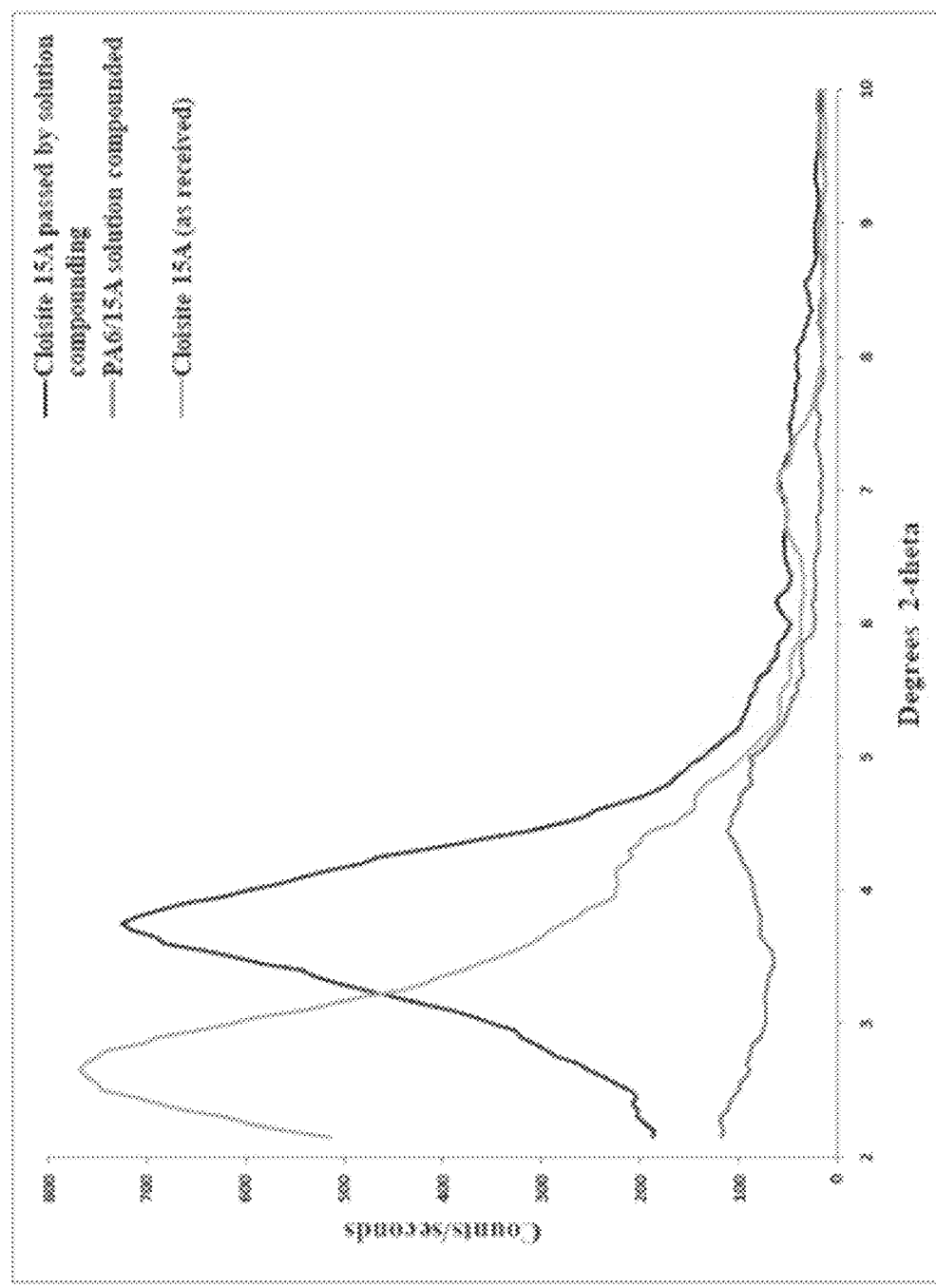
FIG. 10 shows the XRD diffraction patterns for the different samples.

XRD spectra are shown for N6-Na$^+$ (FIG. 8), N6-30B (FIG. 9), and N6-15A (FIG. 10). A close investigation of FIG. 8 reveals the existence of a peak for the as-received Cloisite Na$^+$ corresponding to a basal spacing of 11.7 Å. When subjecting Cloisite Na$^+$ to the same processing routine used for solution compounding, the peak corresponding to the basal reflection slightly shifted to a lower angle, which corresponds to an increase in the d-spacing between the clay layers, indicating a swelling of the structure as a result of stirring of clay in acetic acid. Upon compounding with nylon 6, a significant decrease in the intensity of the peak corresponding to the basal reflection is noticed, which suggests exfoliation of Cloisite Na$^+$. Meanwhile, an appreciable shift of this peak to a lower angle corresponding to a higher basal spacing of 12.8 Å probably suggests the existence of some intercalated regions. The location of this peak is almost coincident with that of the clay passed by the solution compounding routine. Therefore, it can be inferred that the solvent used plays a role in increasing the intergallery spacing of the silicate layers without overcoming the van der Waals forces between these layers, and hence not inducing any significant disorder to the arrangement of the structure. The presence of the polymer leads this system to advance into improved exfoliation. A similar interpretation was offered for N6-Cloisite 30B systems (Giannelis, 1996). In light of this interpretation, and taking into consideration the non-uniform dispersion of Cloisite Na$^+$ in the polymer solution due to the lack of a surfactant, it can be deduced that the presence of localized high concentration of clay in some regions can cause the effect of the solvent to prevail yielding an intercalated structure. Contrarily, in other regions, the amount of polymer is sufficient to promote full exfoliation.

For Cloisite 30B (FIG. 9), the peak corresponding to the basal reflection shifted to a higher angle upon subjecting the clay to the solution compounding process. This is evident of a decrease in the basal spacing of Cloisite 30B to 17.5 Å which might be due to some destruction of the organic modifier. Lee and Char (Lee and Char, 2002) presented a study on the effect of the acidity of solvents on silicate layers and the organic modifier in organo-silicates, in which different acids with different concentrations were used. It was found that for strongly acidic media, the organic modifier tails were more likely to break their bonds formed with the silicate layers and bond to the solvent causing a collapse in the clay gallery spacing, with a corresponding shift of the basal reflection peak to higher XRD angles. Although these authors did not report a decrease in the interlayer spacing when acetic acid was used, the maximum concentration they have used was 0.32 M while glacial acetic acid was used here. The shift of the basal reflection was combined with a significant decrease in intensity as well as broadening of the associated peak. This trend is anticipated and possibly reflects a less uniform order of the silicate layers. Upon compounding Cloisite 30B with nylon 6, no peak associated with basal reflection was detected suggesting a high degree of exfoliation.

A similar trend is shown in FIG. 10, for Cloisite 15A samples. Subjecting Cloisite 15A to solution compounding results in the decrease of the basal spacing to 23.56 Å and compounding it with nylon 6 lead to improved exfoliation evidenced by the disappearance of the peak associated with the basal reflection.

The degree of exfoliation was quantified using particle density measurement technique, where the number of clay platelets per unit surface area is determined and used as a measurement of the degree of exfoliation. This was used on the nanocomposite samples (prepared by solution compounding in the Examples). The values are:

Cloisite 15A, the values of nanocomposites made in the Examples range between 400 and 500 platelets/square micron.

Cloisite Na$^+$, the values of nanocomposites made in the Examples range between 800 and 1000 platelets/square micron.

Cloisite 30B, the values of nanocomposites made in the Examples range between 50 and 100 platelets/square micron.

Nanoindentation

Figure 11:
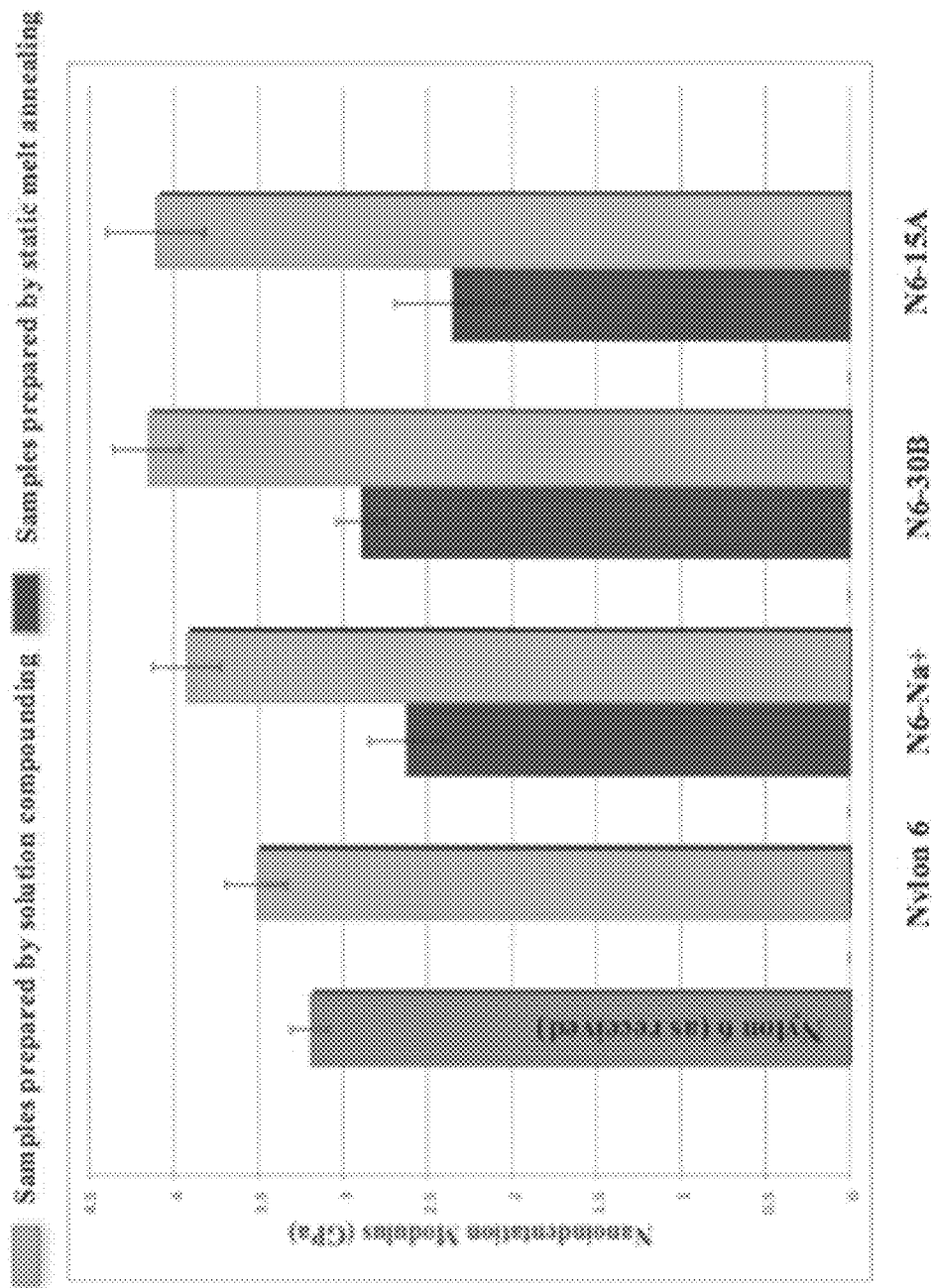
FIG. 11 shows the average nanoindentation modulus values for the different composite samples.
Figure 12:
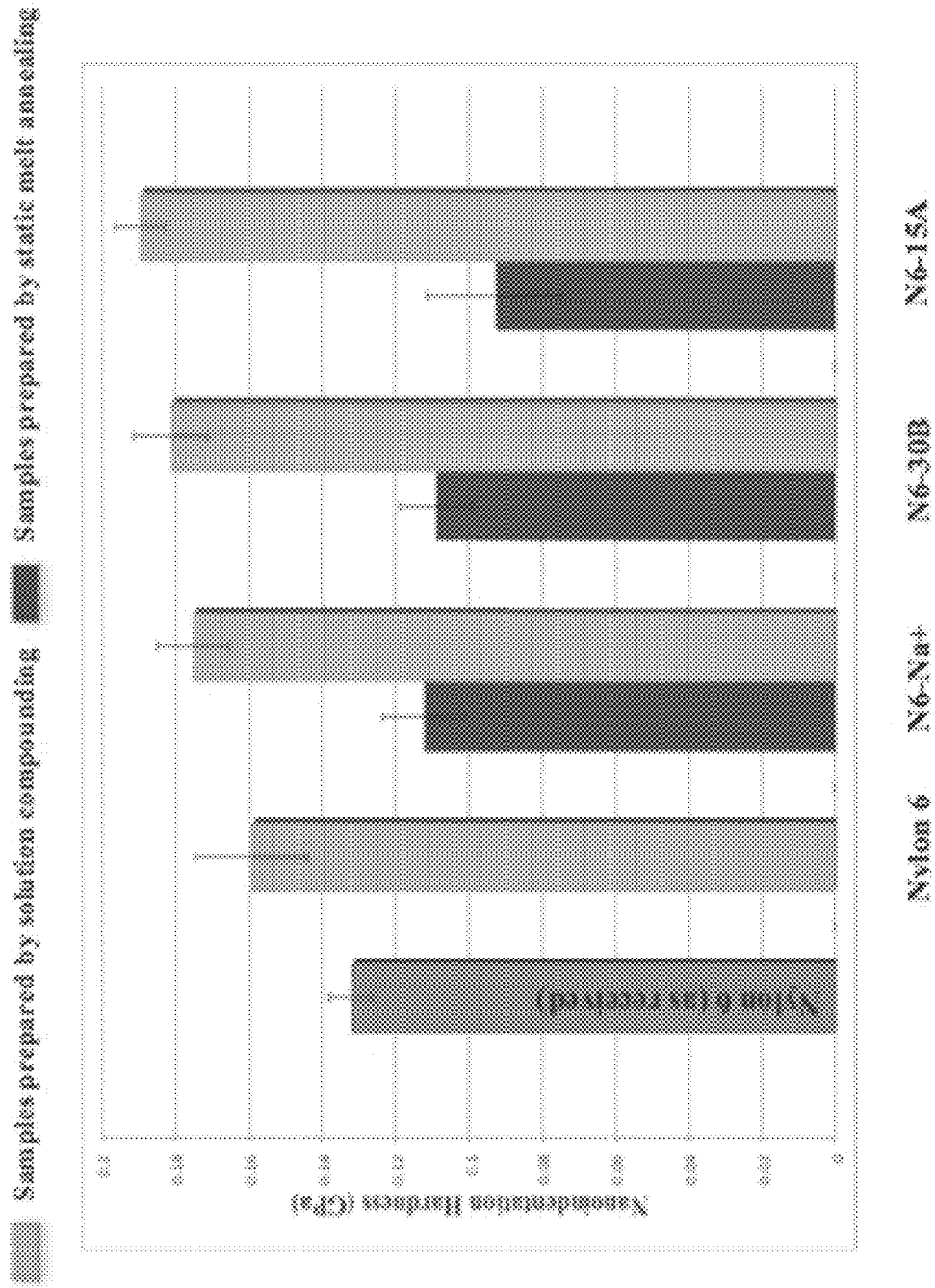
FIG. 12 shows the average nanoindentation hardness values for the different composite samples.

Nanoindentation testing, as presented in FIG. 11 and FIG. 12, shows improvement in the mechanical behavior (modulus and hardness) of the nylon 6 sample produced by the solution technique compared to the as-received polymer. This is thought to be due to the solution compounding routine. Dissolution of nylon 6 seemed to result in a structure of fine particles that melt at a faster rate compared to the pellets used for preparing the as-received reference sample. Since compression molding was carried out at 240° C. for a constant time of 5 minutes, solution-compounded samples were melt-annealed for a longer time, which would be expected to result in increasing the molecular weight of the formed samples (Tidick et al., 1984). In this respect, it can be seen that nylon 6 processed with the same routine used for solution compounding had a higher modulus and hardness than the as-received one. All samples of nylon 6 compounded with the different clays have improved modulus and hardness compared to neat nylon 6 processed using the same processing routine. Samples prepared by static melt annealing (see below) show significant deterioration in their mechanical behavior compared to samples prepared by solution compounding. This is indicative of the fact that the observed improved mechanical properties of the composite samples are a consequence of the solution compounding with no noticeable contribution from static annealing during the compression molding step.

Table 4 presents enhancements in nanoindentation modulus and hardness. Both observed and corrected values for the effect of subjecting the neat polymer to the same processing routine used for solution compounding are reported.

TABLE 4

Nanoindentation modulus and hardness values for the different composite samples

|  | Modulus Enhancement | | Hardness Enhancement | |
| --- | --- | --- | --- | --- |
|  | Observed[§] | Corrected* | Observed[§] | Corrected* |
| N6-Na$^+$ | 12% | 11% | 10% | 8% |
| N6-30B | 18% | 16% | 14% | 11% |
| N6-15A | 17% | 15% | 19% | 15% |

[§]Percent enhancement values determined relative to the neat polymer.
*Percent enhancement values determined relative to the neat polymer, and corrected for the effect of the neat polymer as a result of processing under the same conditions as each of the respective composite sample.

Melt Flow Index

Figure 13:
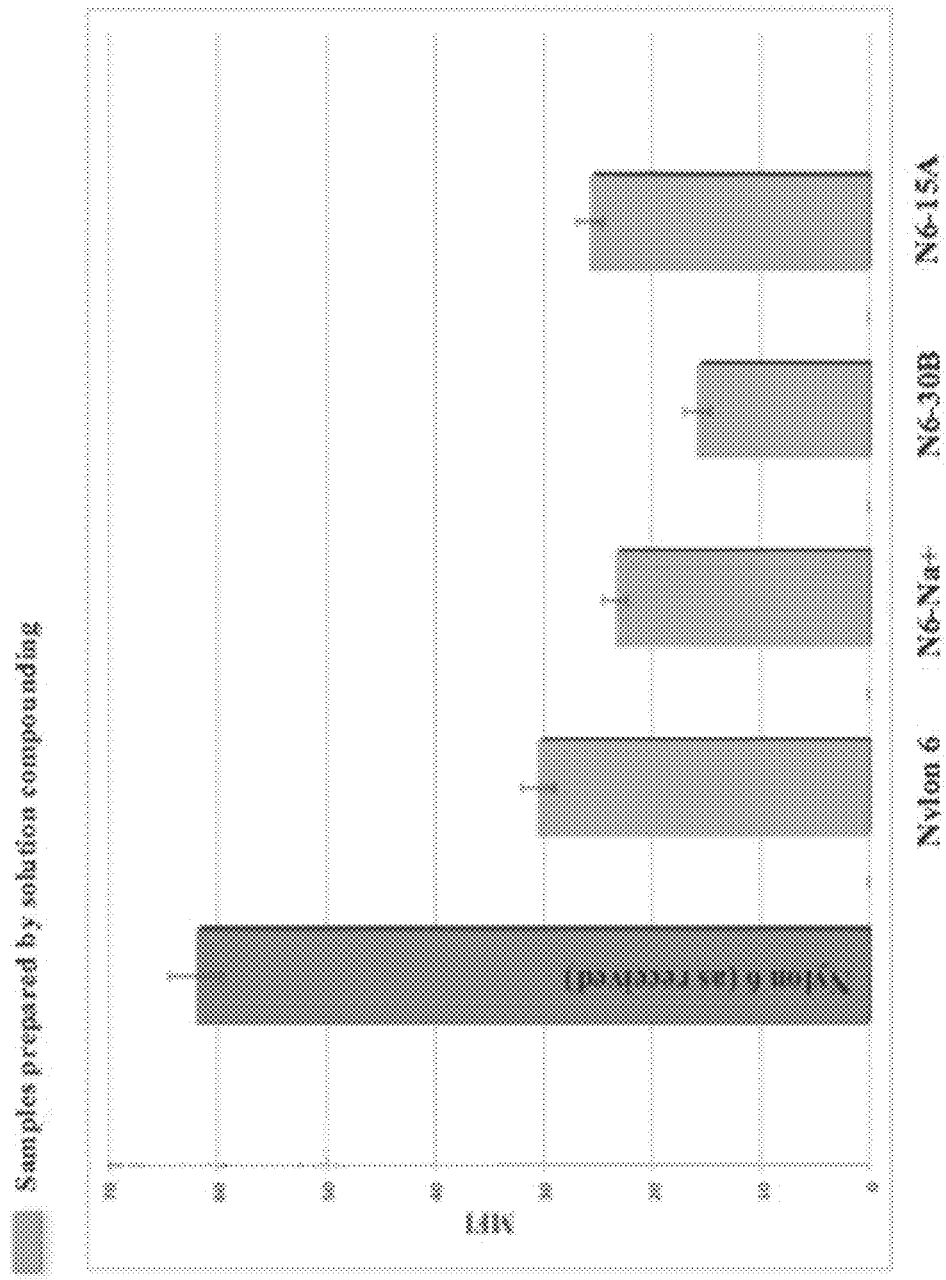
FIG. 13 shows the melt flow index of nylon6/MMT nanocomposites.

MFI testing as seen in FIG. 13 shows a significant decrease in MFI for nylon 6 obtained after processing by the solution compounding routine as compared to the as-received polymer, which might be due to the increase in the molecular weight of the polymer as a result of melt annealing for a longer time (Tidick et al., 1984), as explained before. All composite samples exhibit lower MFI values. N6-30B sample was found to have the lowest MFI (highest melt viscosity) possibly due to superior dispersion of and better exfoliation of the silicate layers, evident in the TEM images (FIG. 14) and corroborated by the XRD results.

TEM

Figure 14:
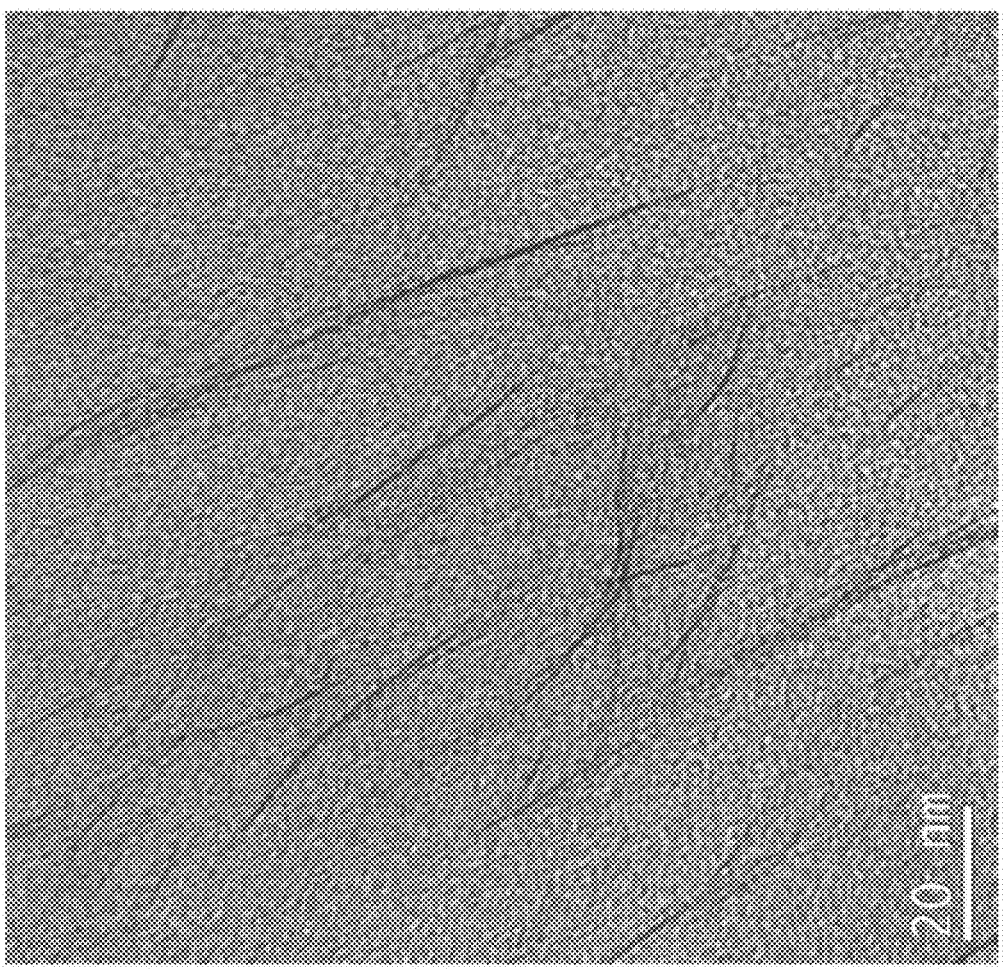
FIG. 14 shows the TEM micrograph for N6-30B prepared by solution compounding.

TEM investigation of the N6-30B samples as depicted in FIG. 14 reveals a structure mainly composed of individual layers uniformly dispersed within the polymer matrix. This is in accordance with the XRD results.

Figure 15:
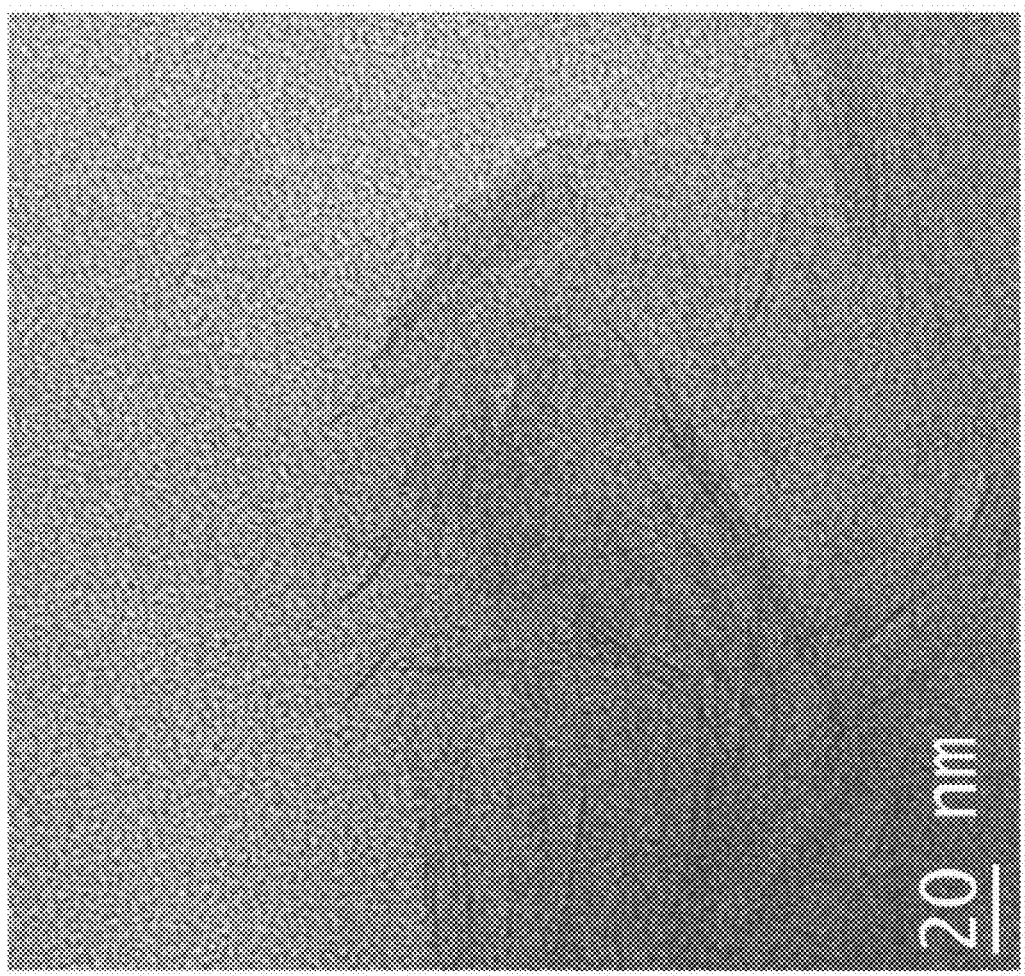
FIG. 15 shows the TEM micrograph for N6-Na+ prepared by solution compounding.

For the N6-Na$^+$ composite, TEM images (FIG. 15) reveal an intercalated structure with some delaminated layers. Compared to N6-30B composite, a relatively poor dispersion of silicate layers can be observed. This is anticipated and is believed to be due to the lack of organic modifier in Cloisite Na$^+$.

Figure 16:
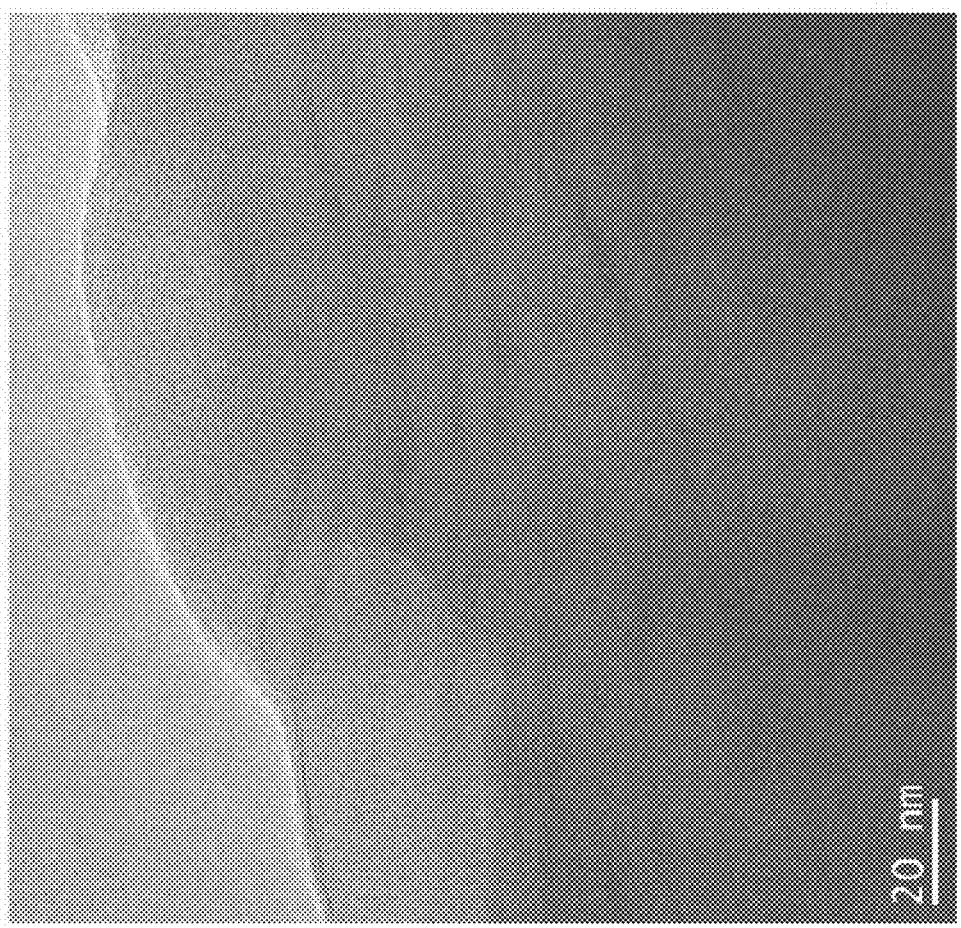
FIG. 16 shows the TEM micrograph for N6-15A prepared by solution compounding.

For the TEM images of the N6-15A composite, (FIG. 16), mostly individual layers are depicted as uniformly dispersed within the polymer matrix. However, TEM investigation of different areas across the sample revealed inconsistent distribution of silicate layers. This sheds light on the role of the organic modifier in determining the morphology of the resulting composite. While it is convenient to assume that the presence of the organic modifier facilitates the intercalation of the polymer chains into the clay galleries by increasing the intergallery gap of the clay particles, a counterintuitive finding suggests that the organic modifier might tend to stabilize the structure of silicate layers maintaining their orderly layered structure. In a recent study, we have shown that the presence of alkylammonium ions tends to preserve the structure of silicate layers in OMMT Cloisite 30B (Ramadan et al., 2010). A similar observation was made by Mani et al. for OMMT Cloisite 15A (Mani et al., 2003). It is therefore thought that the presence of the organic modifier increases the interlayer spacing, thereby making it easier for the polymer solution to induce a significant amount of disorder leading to delamination of silicate layers. The organic modifier is thought then to act in a twofold manner: bonding with the polymer matrix and stabilizing the layered structure of the clay by restacking of silicate layers. In the case of N6-30B composite, having a polar organic modifier, thereby more likely to bond with nylon 6, the first factor is expected to prevail leading to full exfoliation and uniform dispersion while in the case of N6-15A composite, having a non-polar organic modifier, the latter factor is expected to prevail leading to lesser exfoliation and a less uniform dispersion of silicate layers.

TEM results of all composites prepared by static melt annealing (not shown) depicted poor exfoliation and dispersion for N6-30B and N6-15A samples. The structure of N6-Na$^+$ sample however consisted of unevenly distributed clay clusters free of individual silicate layers. These observations come in accordance with nanoindentation results showing significant deterioration in the mechanical behavior of samples prepared by static melt annealing. This further corroborates that the structures of composite samples depicted in TEM images are resulting from the solution mixing process and without any noticeable effect from the static melt annealing step.

FTIR Results

Figure 17:
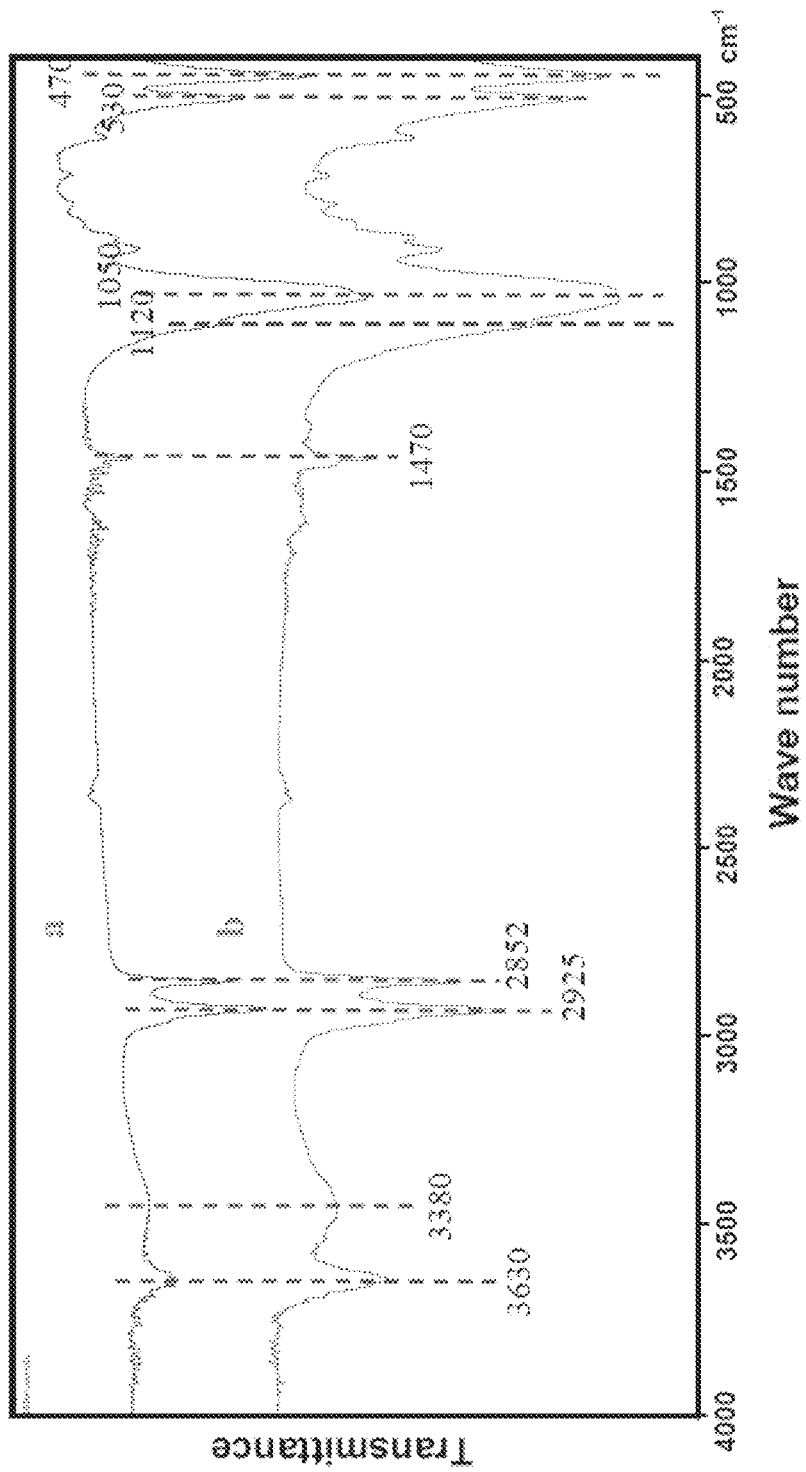
FIG. 17 shows the FTIR of (a) as-received Cloisite 15A compared to (b) Cloisite 15A subjected to the same processing routine used for solution compounding.
Figure 18:
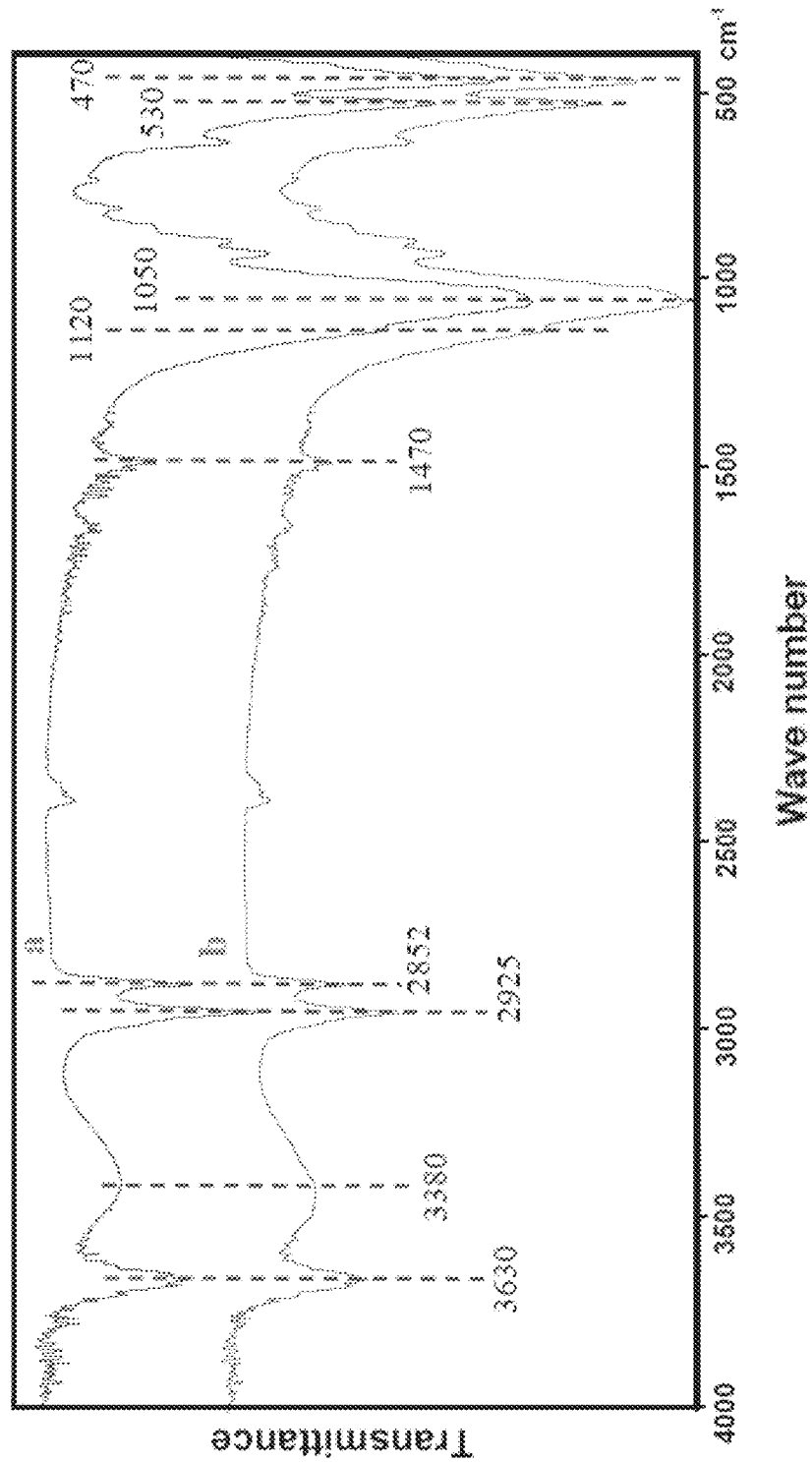
FIG. 18 shows the FTIR of (a) as-received Cloisite 30B compared to (b) Cloisite 30B subjected to the same processing routine used for solution compounding.
Figure 19:
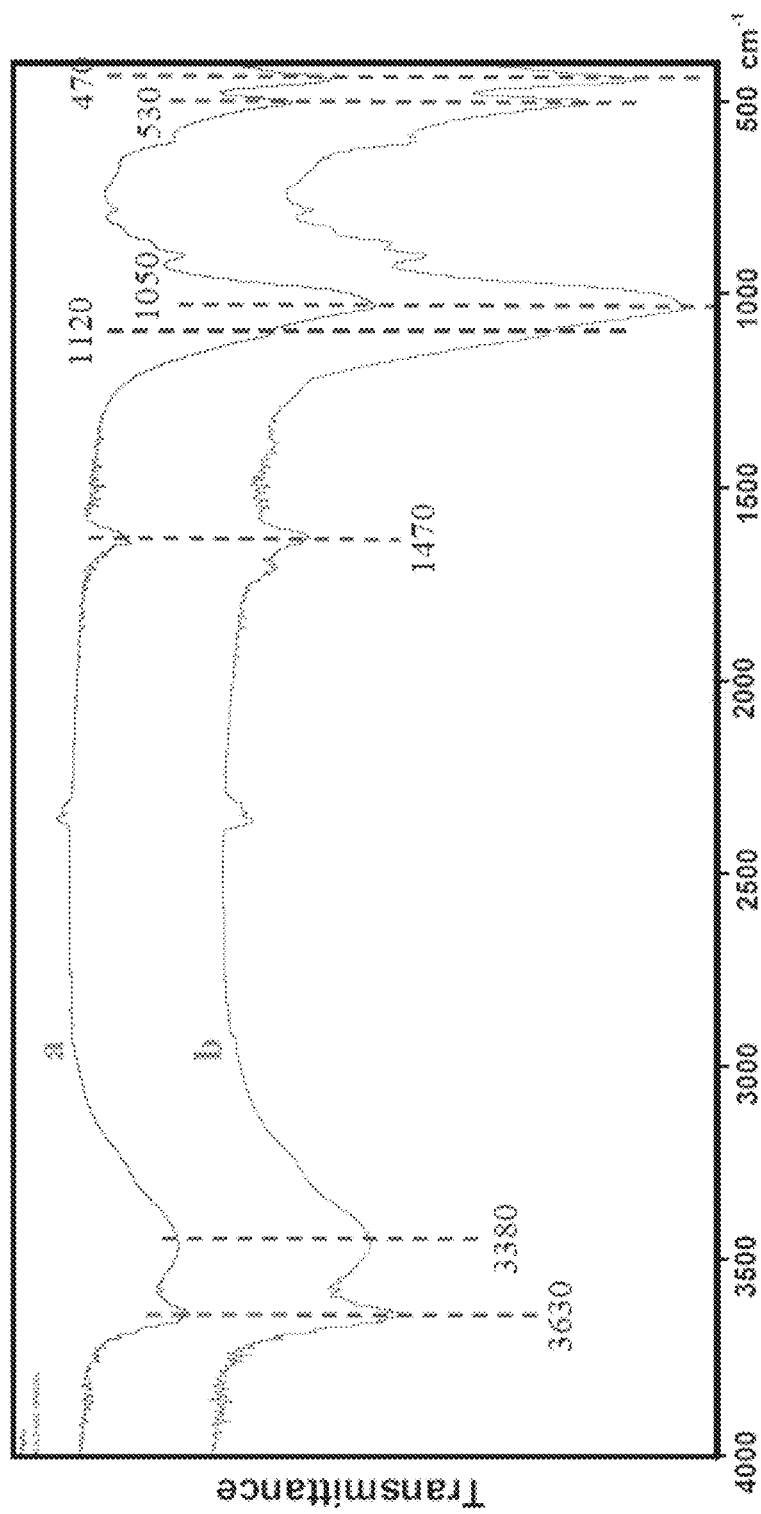
FIG. 19 shows FTIR of (a) as-received Cloisite Na+ compared to (b) Cloisite Na+ subjected to the same processing routine used for solution compounding.

FTIR scans were carried out for pristine clay samples and ones having been subjected to the solution compounding process in order to detect any effect of this process on the chemical structure of silicate layers and/or the organic modifier. Comparing the IR spectra for these two categories of samples revealed no significant change in the structure of silicate layers and the organic modifiers. FIGS. 17 & 18 depict the presence of bands at ~2920 cm$^{-1}$, ~2850 cm$^{-1}$ and at ~1470 cm$^{-1}$ post solution compounding, which is indicative of the preservation of alkylammonium ions in Cloisite 30B and Cloisite 15A.

Static Melt Annealing

Following the process of solution compounding in which the clay platelets are dispersed within the polymer matrix, compression molding is usually conducted to shape the powders into disks or billets before further testing. The compression molding steps entails heating the sample beyond its melting temperature for 5 min. This is known as static melt annealing. Reports in the literature have claimed that static melt annealing can have an effect on the final structure of the clay nanocomposites provided sufficient time and good compatibility between the clay and the polymer exist. Accordingly, in order to filter out the effect of this step on the structure of our composites, "blank" samples prepared by static melt annealing, without prior solution compounding were prepared and tested. In this document, a detailed description of the preparation routine is provided and TEM micrographs for the resulting samples are presented. Nanoindentation measurements for these samples are included in the draft of the paper entitled "Fabrication of Nylon 6-Montmorillonite Clay Nanocomposites by Solution Compounding".

Preparation:

500 ml of glacial acetic acid were heated till boiling (108° C.)

50 g of nylon6 were added to the boiling acetic acid and magnetically stirred till they were totally dissolved (almost in 15 minutes)

The dissolved nylon6 was then washed with 2000 ml of methanol (methanol to acetic acid volume ratio=4:1).

The polymer was then put in the oven under vacuum at 90° C. for 48 hours to dry.

The resulting polymer was mechanically mixed with 5 wt % of each of (Cloisite™ 30B, Cloisite Na$^+$, and Cloisite 15A) clays—preheated under vacuum for 24 hours at 90° C. in order to reduce the moisture content—in a Turbula mixer at 96 rpm for 1 hour.

The mixture was then compression molded at 240° C. for 5 minutes under 65 MPa into cylindrical samples having a diameter of 1 cm and a height of 2 cm.

TEM

Figure 20:
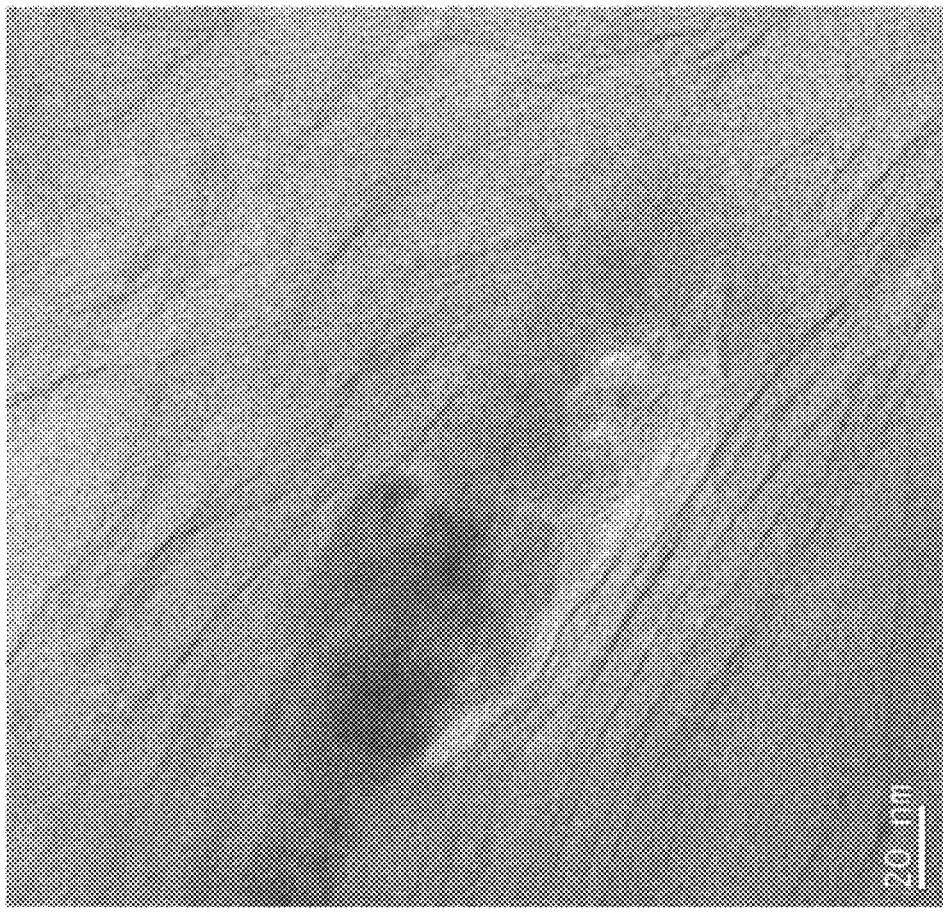
FIG. 20 shows the TEM micrograph for N6-30B prepared by static melt annealing.

Although TEM micrographs for nylon 6-30B samples prepared by static melt annealing (FIG. 20) show an exfoliated structure, nanoindentation results (presented in the attached draft of the paper) show significant deterioration in the mechanical behavior of this sample compared to N6-30B sample prepared by solution compounding. This might be due to poor distributive mixing of silicate layers within the polymer matrix.

Figure 21:
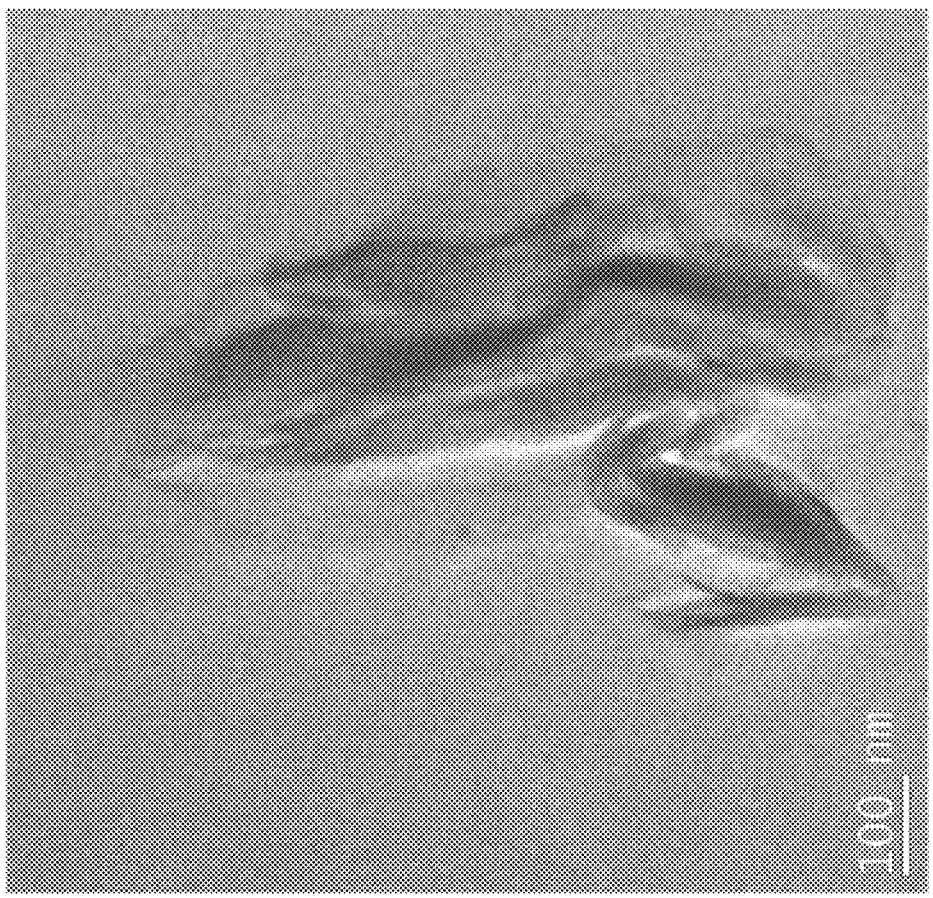
FIG. 21 shows the TEM micrograph for N6-Na+ prepared by static melt annealing; and, FIG. 22 shows the TEM micrograph for N6-15A prepared by static melt annealing.

TEM micrographs for statically melt annealed nylon 6-Na+ samples (FIG. 21) depict clusters of clay particles. No instances of intercalated or exfoliated silicate layers could be observed.

Figure 22:
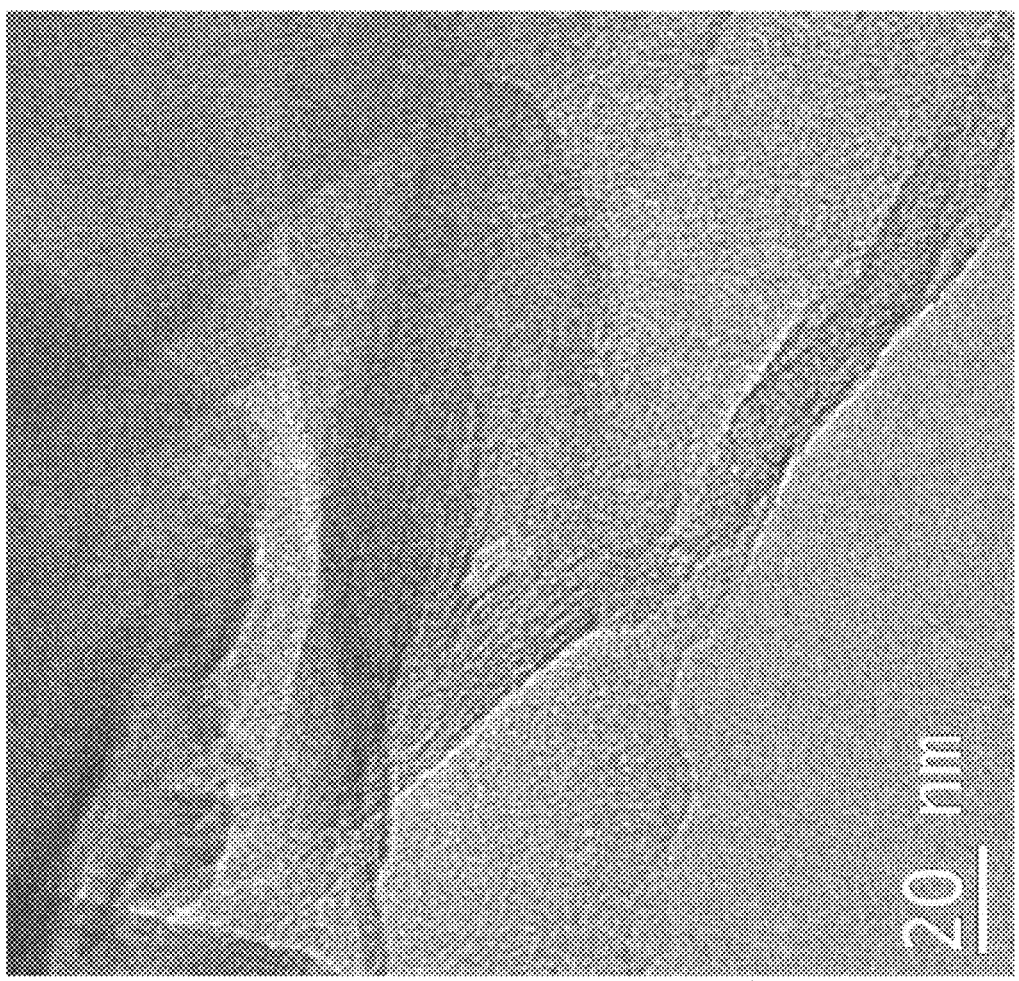

For nylon 6-15A samples prepared by static melt annealing, TEM micrographs (FIG. 22) reveal non-intercalated clay tactoids.

CONCLUSIONS

XRD and TEM investigations of pristine montmorillonite clays, clays processed with nylon 6 by solution compounding, as well as clays subjected to the solution compounding routine without polymer provided clear evidence that solution compounding resulted in very good mixing between the clays and nylon 6. A high degree of exfoliation was achieved even for cases of low/no polar interactions between the clays and the polymer matrix. This positively reflected on the mechanical properties of the obtained composites denoting significant enhancement in the measured nanoindentation modulus and hardness. No contribution to the findings was observed to result from the compression molding step in sample preparation. This denoted that the observed exfoliated structures of the composites together with the associated enhancement of mechanical properties were due to solution compounding with no contribution from static melt annealing. FTIR results confirmed the preservation of the alkylammonium ions in Cloisite 30B and Cloisite 15A after being subjected to solution compounding processing.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

REFERENCES

All patents and publications mentioned in the specification are indicative of the level of those skilled in the art to which the invention pertains. All patents and publications are herein incorporated by reference in their entirety to the same extent as if each individual publication was specifically and individually indicated to be incorporated by reference.

PUBLICATIONS

Abdel Gawad A., Esawi A. M. K., Ramadan A. R. Structure and properties of nylon 6 Clay nanocomposites: Effect of temperature and reprocessing J. Mate. Sci 45, 2010, 6677-6684.

Ahmadi, S. J., Huang, Y. D., Li, W. Review: Synthetic routes, properties and future applications of polymer-layered silicate nanocomposites. J. Mater. Sci. 39, 2004, 1919-1925.

Aranda P, Ruiz-Hitzky E. "Poly(ethylene oxide)-silicate intercalation materials." Chem Mater 1992; 4:1395-403.

Burnside, S. D., Giannelis, E. P. Synthesis and properties of new poly(dimethylsiloxane) nanocomposites. Chem. Mater. 7 1995, 1597-1600.

Chanda, Manas, and Salil K. Roy. "Fabrication Processes." Plastics Technology Handbook. 4th ed. 47 Vol. CRC Press, 2007.

Chen, B. Polymer-Clay Nanocomposites: An Overview with emphasis on interaction mechanisms. Brit. Ceram. T. 103, 2004, 241-249.

Dennis, H. R., Hunter, D. L., Chang, D., White, J. L., Cho, J. W., Paul, D. R. Effect of melt processing conditions on the extent of exfoliation in organoclay-based nanocomposites. Polymer 42, 2001, 9513-9522.

Gao, F. Clay/polymer composites: the story Mater Today 7, 2004, 50-55.

Gao, Fengge. "Clay/polymer composites: the story". Materials Today November 2004

Giannelis, E. P. "Polymer Layered Silicate Nanocomposites." Advanced Materials 8.1 (1996): 29-35.

Giannelis, E. P. Polymer-layered silicate nanocomposites: synthesis, properties and applications. Appl. Organomet. Chem. 12, 1998, 675-680.

Hasegawa, Naoki, et al. "Nylon 6/Na-montmorillonite Nanocomposites Prepared by Compounding Nylon 6 with Na-montmorillonite Slurry." Polymer 44.10 (2003): 2933-7.

Jeon, H. G., Jung, H. T., Lee, S. W., Hudson, S. D. Morphology of polymer silicate nanocomposites. High density polyethylene and a nitrile. Polym. Bull. 41, 1998, 107-113.

Kim, S. W., Jo, W. H., Lee, M. S., Ko, M. B., Jho, J. Y. Effects of shear on melt exfoliation of clay in preparation of nylon organoclay nanocomposites. Polym. J. 34, 2002, 103-111.

LeBaron, P. C., Wang, Z., Pinnavaia, T. J. Polymer-layered silicate nanocomposites: an overview. Appl. Clay Sci. 15, 1999, 11-29.

Lee, D., Char, K. Effect of acidity on the deintercalation of organically modified layered silicates. Langmuir 18, 2002, 6445-6448.

Magaraphan, R., Lilayuthalert, W., Sirivat, A., Schwank, J. W. Preparation, structure, properties and thermal behavior of rigid-rod polyimide/montmorillonite nanocomposites. Compos. Sci. Technol. 61, 2001, 1253-1264.

Mani, G., Fan, Q., Ugbolue, S. C., Eiff, I. M., 2003. Size reduction of clay particles in nanometer dimensions. Mater. Res. Soc. Symp. Proc. 740.

Material Safety Data Sheet Acetic Acid MSDS. Science Lab, 11 Jun. 2008. http://www.sciencelab.com/msds.php.msdsId=9924100

Material Safety Data Sheet Formic Acid, 85%, F. C. C. MSDS. Science Lab, 11 Jun. 2008. <http://www-.sciencelab.com/msds.php.msdsId=9924100>.

Mora, R. J.; Vilatela, J. J.; Windle, A. H. "Properties of composites of carbon nanotube fibres" Composites Science & Technology, August 2009, Vol. 69 Issue 10, p 1558-1563.

Ogata, N., Jimenez, G., Kawai, H., Ogihara, T. Structure and thermal/mechanical properties of poly(L-lactide)-clay blend. J. Polym. Sci. Part B: Polym. Phys. 35 1997, 389-396.

Okada, A., and A. Usuki. "Twenty Years of Polymer-Clay Nanocomposites." Macromolecular Materials and Engineering 291.12 (2006): 1449-76.

Okada, A., Kawasumi, M., Usuki, A., Kojima, Y., Kurauchi, T., Kamigaito O. Synthesis and properties of nylon-6/clay hybrids. In: Schaefer D W, Mark J E, editors. Polymer based molecular composites. MRS Symposium Proceedings, Pittsburgh, vol. 171; 1990. p. 45-50.

Paci, A., Filippi, S., Magagnini, P. Nanostructure development in nylon 6-Cloisite-30B composites. Effects of the preparation conditions. Europ. Polym. J. 46, 2010, 838-853.

Pavlidou, S., and C. D. Papaspyrides. "A Review on polymer-layered Silicate Nanocomposites." Progress in Polymer Science 33.12 (2008): 1119-98.

Polymer handbook, 4th ed., J. Brandrup, E. H. Immergut, and E. A. Grulke, editors; A. Abe, D. R. Bloch, associate editors, New York: Wiley, 1999.

Ramadan, A. R., Esawi, A. M. K., Abdel Gawad A. Effect of ball milling on the structure of $Na^+$-montmorillonite and organo-montmorillonite (Cloisite 30B), Appl. Clay Sci. 47, 2010, 196-202.

Sinha Ray, Suprakas, and Masami Okamoto. "Polymer/layered Silicate Nanocomposites: A Review from Preparation to Processing." Progress in Polymer Science 28.11 (2003): 1539-641.

Strawhecker, K. E., Manias, E. Structure and properties of poly(vinyl alcohol)/Na-montmorillonite nanocomposites. Chem. Mater. 12, 2000, 2943-2949.

The Department of Chemistry, Michigan State University, "Nanocomposites-Classification Types, Potential Applications, Interactions and Novel Nanocomposites". Azom. 1 Nov. 2004<http://www.azonano.com/details.asp/ArticleID=1283>.

Tidick, P., Fakirov, S., Avramova, N., Zachmann, H. G. Effect of melt annealing time on the crystallization of nylon-6 with various molecular weights. Coll. Polym. Sci. 262, 1984, 445-449.

Usuki, A., Hasegawa, N., Kato, M. Polymer-clay nanocomposites. Adv. Polym. Sci. 179, 2005, 135-195.

Vaia R A, Ishii H, Giannelis E P. "Synthesis and properties of two-dimensional nanostructures by direct intercalation of polymer melts in layered silicates." Chem Mater 1993; 5: 1694-6.

Vaia, R. A., Giannelis, E. P. Polymer melt intercalation in organically modified layered silicates: model predictions and experiment. Macromolecules 30, 1997, 8000-8009.

Vaia, R A, Giannelis, E P. Lattice of polymer melt intercalation in organically-modified layered silicates. Macromolecules 30, 1997, 7990-7999.

Wu, J., Lerner, M. M. Structural, thermal, and electrical characterization of layered nanocomposites derived from sodium-montmorillonite and polyethers. Chem. Mater. 5, 1993, 835-838.

Yano, K., Usuki, A., Okada, A., Kurauchi, T., Kamigaito, O. Synthesis and properties of polyimide-clay hybrid. J. Polym. Sci., Part A: Polym. Chem. 31, 1993, 2493-2498.

PATENTS

U.S. Pat. No. 5,430,068

The invention claimed is:

1. A method for producing a nanocomposite comprising the step of:
    dissolving nylon 6 in a solvent resulting in a nylon 6/solvent solution;
    dispersing a montmorillonite clay in the nylon 6/solvent solution resulting in a nylon 6/montmorillonite clay solution; and,
    flushing the nylon 6/montmorillonite clay solution with a non-aqueous flushing medium that does not dissolve nylon 6, thereby removing the solvent from the nylon 6/montmorillonite clay solution and thereby resulting in a solvent-free nylon 6/montmorillonite clay nanocomposite.

2. The method of claim 1, wherein the montmorillonite clay comprises an inorganic ion that is sodium, potassium, calcium, or magnesium.

3. The method of claim 1, wherein the montmorillonite clay further comprises a surfactant.

4. The method of claim 1, wherein the surfactant comprises an organic surfactant with the structure of an ammonium ion ($NR_4^+$) wherein R represents an alkyl or aryl group.

5. The method of claim 4, wherein the organic surfactant is methyl bis-2-hydroxyethyl hydrogenated alkyl tallow quaternary ammonium ion; dimethyl, bis-hydrogenated alkyl tallow ammonium ion; benzyl, dimethyl hydrogenated alkyl tallow ammonium ion; trialkyl ammonium ion; octadecyltrimethyl ammonium ion; dioctadecyldimethyl ammonium ion; tricetadecylmethyl ammonium ion; dodecylammonium ion; hexadecylammonium ion; or distearyl dimethyl ammonium ion.

6. The method of claim 4, wherein the R groups of the organic surfactant exclude hydroxyethyl groups.

7. The method of claim 1, wherein the solvent is acetic acid, formic acid, trichloro acetic acid, phosphoric acid, sulfuric acid, chlorophenol, m-cresol, ethylene carbonate, HMPT (Hexamethylphosphoric Triamide), or mixtures thereof.

8. The method of claim 1, wherein the non-aqueous flushing medium is alcohol, ester, ether, ketone, chloroform, or a mixtures thereof.

9. The method of claim 8, wherein the alcohol is methanol, ethanol, or propanol.

10. The method of claim 8, wherein the ester is methyl formate, ethyl formate, methyl propionate, isobutyl propionate, ethyl propionate, methyl acetate, or ethyl acetate.

11. The method of claim 8, wherein the ketone is acetone, diethyl ketone, methyl ethyl ketone, methyl propyl ketone, or methyl isopropyl ketone.

12. The method of claim 1, wherein the volume ratio between solvent and flushing medium is 1:5, 1:4, 1:3, 1:2, 1:1, 2:1, 3:1; 4:1 or 5:1.

13. The method of claim 1, wherein the flushing medium is flushed at a flow rate of at most 50 mL/min.

14. The method of claim 1, wherein the flushing medium is flushed at a flow rate of at least 5 mL/min.

* * * * *